United States Patent
Zhang et al.

(10) Patent No.: US 12,485,979 B2
(45) Date of Patent: Dec. 2, 2025

(54) WHEEL-FOOTED BIMODAL MECHANICAL LEG AND ROBOT

(71) Applicant: Tencent Technology (Shenzhen) Company Limited, Shenzhen (CN)

(72) Inventors: Dongsheng Zhang, Shenzhen (CN); Kun Xiong, Shenzhen (CN); Xiangyu Chen, Shenzhen (CN); Sicheng Yang, Shenzhen (CN); Qinqin Zhou, Shenzhen (CN); Liangwei Xu, Shenzhen (CN); Qiwei Xu, Shenzhen (CN); Wanchao Chi, Shenzhen (CN); Xiong Li, Shenzhen (CN); Zhengyou Zhang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 864 days.

(21) Appl. No.: 17/747,915

(22) Filed: May 18, 2022

(65) Prior Publication Data

US 2022/0274657 A1    Sep. 1, 2022

Related U.S. Application Data

(63) Continuation of application No. PCT/CN2021/093698, filed on May 13, 2021.

(30) Foreign Application Priority Data

| Jul. 10, 2020 | (CN) | 202010662698.9 |
| Jul. 10, 2020 | (CN) | 202010663751.7 |
| Aug. 3, 2020 | (CN) | 202010769371.1 |

(51) Int. Cl.
  *B62D 57/028*  (2006.01)
  *B62D 57/032*  (2006.01)

(52) U.S. Cl.
  CPC ......... *B62D 57/028* (2013.01); *B62D 57/032* (2013.01)

(58) Field of Classification Search
  CPC .................................................. B62D 57/028
  See application file for complete search history.

(56) References Cited

U.S. PATENT DOCUMENTS 12,268,641 B2 *   4/2025   Nakano ............... A61G 5/046
2019/0193798 A1   6/2019   Lu

FOREIGN PATENT DOCUMENTS

| CN | 101219683 A | 7/2008 |
| CN | 101224764 A | 7/2008 |

(Continued)

OTHER PUBLICATIONS

Tencent Technology, ISR, PCT/CN2021/093698, Jul. 30, 2021, 2 pgs.

(Continued)

*Primary Examiner* — Kevin Hurley
(74) *Attorney, Agent, or Firm* — Morgan, Lewis & Bockius LLP

(57) ABSTRACT

A robot comprises a wheel-footed bimodal mechanical leg having a driving apparatus, a thigh unit, and a calf unit. A joint end of the thigh unit is hingedly connected to a joint end of the calf unit by a rotary shaft. The driving apparatus is connected to the rotary shaft by a transmission apparatus. The calf unit comprise a locking mechanism. The robot can operate in a footed mode and a wheeled mode. In the footed mode, the calf units and the rotary shafts in n mechanical legs are fixedly connected to each other, where n is an integer that is at least two. In the wheeled mode, the calf units and the rotary shafts in at least two wheel-footed bimodal mechanical legs are rotatably connected to each other.

18 Claims, 22 Drawing Sheets

(56) References Cited

FOREIGN PATENT DOCUMENTS

| | | | | |
|---|---|---|---|---|
| CN | 101298260 | A | | 11/2008 |
| CN | 101219683 | B | * | 9/2010 |
| CN | 201626257 | U | | 11/2010 |
| CN | 103001151 | A | | 3/2013 |
| CN | 104029745 | A | | 9/2014 |
| CN | 104443104 | A | | 3/2015 |
| CN | 104608837 | A | | 5/2015 |
| CN | 105711675 | A | | 6/2016 |
| CN | 105946483 | A | | 9/2016 |
| CN | 106428284 | A | | 2/2017 |
| CN | 104608837 | B | * | 4/2017 ........... B62D 57/028 |
| CN | 107856753 | A | | 3/2018 |
| CN | 107933728 | A | | 4/2018 |
| CN | 108340985 | A | | 7/2018 |
| CN | 110304167 | A | * | 10/2019 |
| CN | 110549341 | A | | 12/2019 |
| CN | 110962955 | A | | 4/2020 |
| CN | 111204382 | A | | 5/2020 |
| CN | 111301550 | A | | 6/2020 |
| CN | 111391937 | A | | 7/2020 |
| CN | 111591363 | A | * | 8/2020 ........... B62D 57/024 |
| CN | 111731405 | A | | 10/2020 |
| CN | 111891251 | A | | 11/2020 |
| CN | 113602378 | A | * | 11/2021 |
| CN | 116118892 | A | * | 5/2023 ........... B62D 57/028 |
| CN | 115447690 | B | * | 1/2025 ........... B62D 57/028 |
| JP | S 6243370 | A | | 2/1987 |
| JP | 2004230499 | A | | 8/2004 |
| JP | 2006082142 | A | | 3/2006 |
| JP | 2015054372 | A | | 3/2015 |
| KR | 101731731 | B1 | | 4/2017 |
| KR | 20250007193 | A | * | 1/2025 |
| WO | WO 0044536 | A1 | | 8/2000 |
| WO | WO 2011036906 | A1 | | 3/2011 |

OTHER PUBLICATIONS

Tencent Technology, European Office Action, EP Patent Application No. 21838701.7, Jun. 26, 2024, 4 pgs.

Tencent Technology, Japanese Office Action, JP Patent Application No. 2022-552628, Mar. 4, 2024, 8 pgs.

Tencent Technology, Japanese Office Action, JP Patent Application No. 2022-552628, Sep. 11, 2023, 12 pgs.

Tencent Technology, EESR, EP Patent Application No. 21838701.7, Oct. 10, 2023, 12 pgs.

DeepTech deep technology, "You Jump, It Jumps! The Advent of a New Type of Bipedal Robot, Truly 'Human-Machine Integration'", Nov. 4, 2019, 5 pgs., Retrieved from the Internet: https://baijiahao.baidu.com/s?id=1649279052879456466&wfr=spider&for=pc.

Tencent Technology, WO, PCT/CN2021/093698, Jul. 30, 2021, 7 pgs.

Tencent Technology, IPRP, PCT/CN2021/093698, Jan. 10, 2023, 8 pgs.

* cited by examiner

WHEEL-FOOTED BIMODAL MECHANICAL LEG AND ROBOT

CROSS-REFERENCE TO RELATED APPLICATIONS

This application is a continuation application of PCT Patent Application No. PCT/CN2021/093698, entitled "WHEEL-LEG DUAL-MODE MECHANICAL LEG AND ROBOT", filed on May 13, 2021, which claims priority to (1) Chinese Patent Application No. 202010663751.7, filed with the State Intellectual Property Office of the People's Republic of China on Jul. 10, 2020, and entitled "WHEEL-FOOTED BIMODAL MECHANICAL LEG AND ROBOT"; (2) Chinese Patent Application No. 202010662698.9, filed Jul. 10, 2020, and entitled "ROBOT"; and (3) Chinese Patent Application No. 202010769371.1, filed on Aug. 3, 2020, entitled "MECHANICAL LEG AND ROBOT DOG", all of which are incorporated herein by reference in their entirety.

FIELD OF THE TECHNOLOGY

This application relates to the field of robots, and in particular, to a wheel-footed bimodal mechanical leg and a robot.

BACKGROUND OF THE DISCLOSURE

The robot refers to a device (e.g., a machine) that has both footed and wheeled movement modes. A common robot is a robot with two, three, four, or six mechanical legs.

A quadruped robot is provided in the related art. Four mechanical legs are mounted on the quadruped robot. Traveling wheels are mounted at ends of the lower legs (e.g., calves) of the four mechanical legs, to enable the quadruped robot to have both footed and wheeled movement modes.

Because the end of the calf of the foregoing mechanical leg is a wheeled structure, the end of the calf has poor grip and balance.

SUMMARY

Embodiments of this application provide a wheel-footed bimodal mechanical leg and a robot. The technical solutions are as follows:

According to an aspect of this application, a wheel-footed bimodal mechanical leg is provided. The wheel-footed bimodal mechanical leg includes: a driving apparatus, a thigh unit, and a calf unit,
- a root end of the thigh unit is connected to the driving apparatus, a joint end of the thigh unit is hingedly connected to a joint end of the calf unit by a rotary shaft, the rotary shaft is transmission-connected to a traveling wheel, and the driving apparatus is connected to the rotary shaft by a transmission apparatus;
- the calf unit includes a locking component;
- the calf unit being is connected to the rotary shaft when the locking component is in a locked state; and
- the calf unit is rotatably connected to the rotary shaft when the locking component is in an unlocked state.

According to an aspect of this application, a robot is provided, including a body part and n wheel-footed bimodal mechanical legs connected to the body part, n being a positive integer not less than 2.

The technical solutions provided in the embodiments of this application produce at least the following beneficial effects:

The traveling wheel is arranged at a joint between the thigh unit and the calf unit. In the footed mode, the calf unit is fixedly connected to the rotary shaft by the locking component, and the calf unit is driven by the rotary shaft to implement footed traveling. Because the traveling wheel is located at the joint between the thigh unit and the calf unit and do not touch the ground, the calf unit may maintain better grip and balance. In the wheeled mode, all or some of the calf units are rotatably connected to the rotary shafts. The traveling wheels on the rotary shafts implement wheeled traveling. Because the length of the thigh unit can ensure a ground clearance of the body part, the passing ability and passing speed of the robot in the wheeled mode are improved. On the whole, the foregoing robot features a compact structure, high dexterity, and a light weight. Environmental adaptability of the robot may be enhanced to a large extent by flexibly switching between the wheeled mode and the footed mode.

BRIEF DESCRIPTION OF THE DRAWINGS

To describe the technical solutions in the embodiments of this application more clearly, the accompanying drawings required for describing the embodiments are briefly described hereinafter. Apparently, the accompanying drawings in the following descriptions show merely some embodiments of this application, and a person of ordinary skill in the art may obtain other accompanying drawings according to these accompanying drawings without creative efforts.

DESCRIPTION OF EMBODIMENTS

Embodiments of this application provide a robot. The robot can travel in a wheeled mode or a footed mode.

Figure 1:
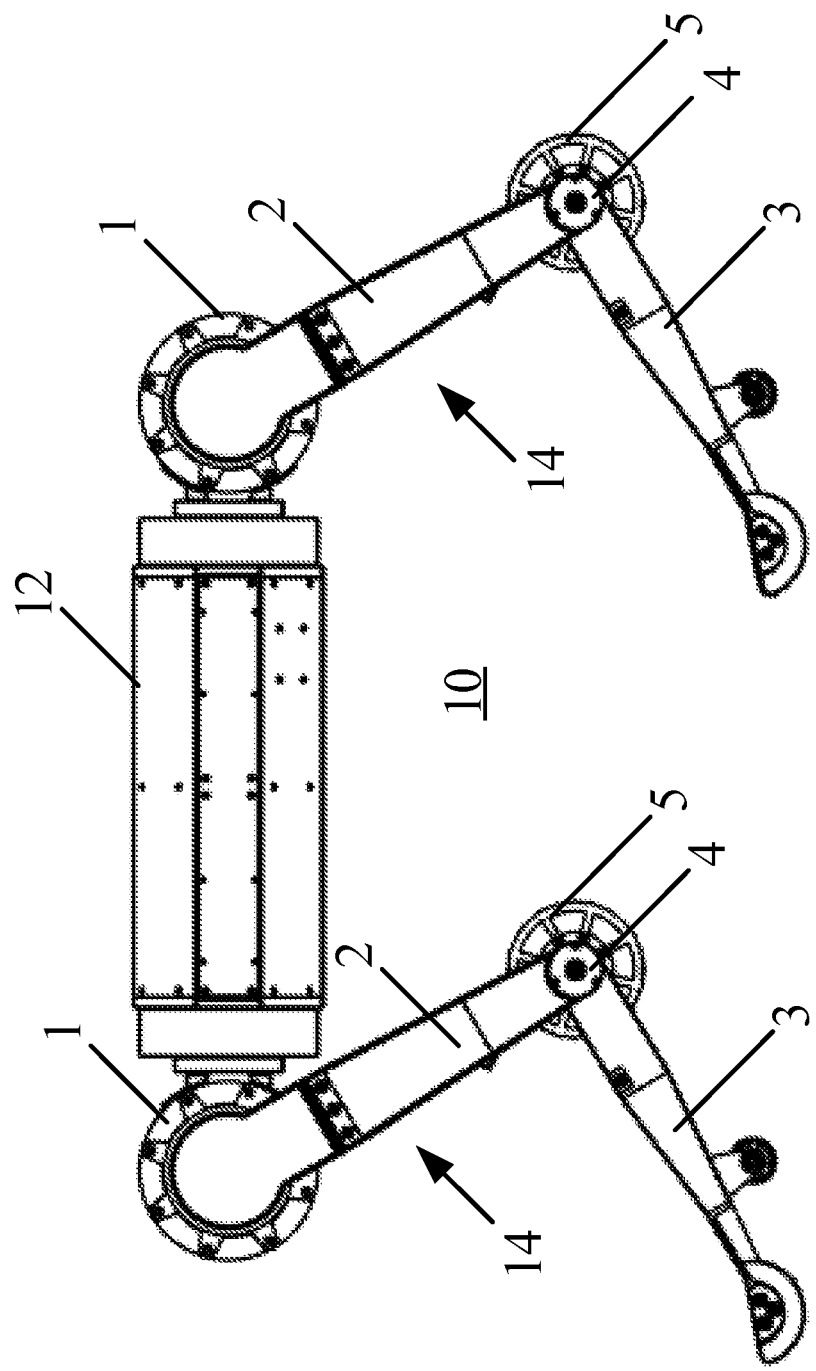
FIG. 1 is a front view of a robot according to an exemplary embodiment of this application.

FIG. 1 is a schematic diagram of a robot 10 according to an exemplary embodiment of this application. The robot 10 includes: a body part 12 and n wheel-footed bimodal mechanical legs 14 connected to the body part 12 (e.g., a trunk part), where n is a positive integer not less than 2.

The wheel-footed bimodal mechanical leg 14 includes a driving apparatus 1, a thigh unit 2 (e.g., upper leg unit), and a calf unit 3 (e.g., lower leg unit). A joint end of the thigh unit 2 is hingedly connected to a joint end of the calf unit 3 by a rotary shaft 4. The rotary shaft 4 is transmission-connected to the traveling wheel 5.

The calf unit 3 includes a locking component (e.g., locking member) for locking or unlocking relative positions of the calf unit 3 and the rotary shaft 4. When the locking component locks the relative positions of the calf unit 3 and the rotary shaft 4, the calf unit 3 is fixedly connected to the rotary shaft 4. The movement of the calf unit 3 is controlled by the rotation of the rotary shaft 4 and switches from the wheeled mode to the footed mode. When the locking component unlocks the relative positions of the calf unit 3 and the rotary shaft 4, the movement of the calf unit 3 is not controlled by the rotation of the rotary shaft 4 and switches from the footed mode to the wheeled mode.

In the footed mode, the calf units 3 and the rotary shafts 4 in the n wheel-footed bimodal mechanical legs 14 are fixedly connected to each other. The robot 10 drives, through the rotary shafts 4, the calf units 3 to travel in a footed movement mode. When the rotary shaft 4 drives the traveling wheel 5 to rotate forward, the calf unit 3 is also driven to rotate forward. When the rotary shaft 4 drives the traveling wheel 5 to rotate backward, the calf unit 3 is also driven to rotate backward. The footed movement can be implemented by repeatedly performing the foregoing process.

In the wheeled mode, the calf units 3 and the rotary shafts 4 in at least two wheel-footed bimodal mechanical legs 14 are rotatably connected to each other. The rotary shaft 4 and the traveling wheel 5 may freely rotate relative to the calf unit 3. Therefore, the rotary shaft 4 drives the traveling wheel 5 to rotate forward, thereby implementing the wheeled movement.

In one example, in a process of switching from the footed mode to the wheeled mode, because the robot 10 touches the ground using an end of the calf unit 3 in the footed mode, the rotary shaft 4 first drives the calf unit 3 to rotate in a first direction of approaching the thigh unit 2. After the traveling wheel 5 touches the ground, the rotary shaft 4 continues to drive the calf unit 3 toward the thigh unit 2 for folding them together. After the calf unit 3 and the thigh unit 2 are folded together, the end of the calf unit 3 is in an off-ground state. The locking component unlocks the relative positions of the calf unit 3 and the rotary shaft 4. The footed mode is switched to the wheeled mode. Subsequently, in the wheeled mode, the rotary shaft 4 drives the traveling wheel 5 to perform the wheeled movement forward or backward.

In one example, in a process of switching from the wheeled mode to the footed mode, because the robot 10 touches the ground using the traveling wheel 5 to the wheeled mode, the rotary shaft 4 first drives the calf unit 3 to rotate in a second direction away from the thigh unit 2. After the end of the calf unit 3 touches the ground, the rotary shaft 4 continues to drive the calf unit 3 to rotate in the second direction, thereby supporting the body part 12 of the robot 10 to rise, and then the traveling wheel 5 is in an off-ground state. The locking component locks the relative positions of the calf unit 3 and the rotary shaft 4. In this case, the wheeled mode is switched to the footed mode. Subsequently, in the footed mode, the rotary shaft 4 drives the calf unit 3 to perform the footed movement forward or backward.

Based on the above, in the robot provided in this embodiment, the traveling wheel is arranged at a joint between the thigh unit and the calf unit. In the footed mode, the calf unit is fixedly connected to the rotary shaft, and the calf unit is driven by the rotary shaft to implement footed traveling. Because the traveling wheel is located at the joint between the thigh unit and the calf unit and do not touch the ground, the calf unit may maintain better grip and balance. In the wheeled mode, all or some of the calf units are rotatably connected to the rotary shafts. The traveling wheels on the rotary shafts implement wheeled traveling. Because the length of the thigh unit can ensure a ground clearance of the body part, the passing ability of the robot in the wheeled mode is improved.

Figure 2:
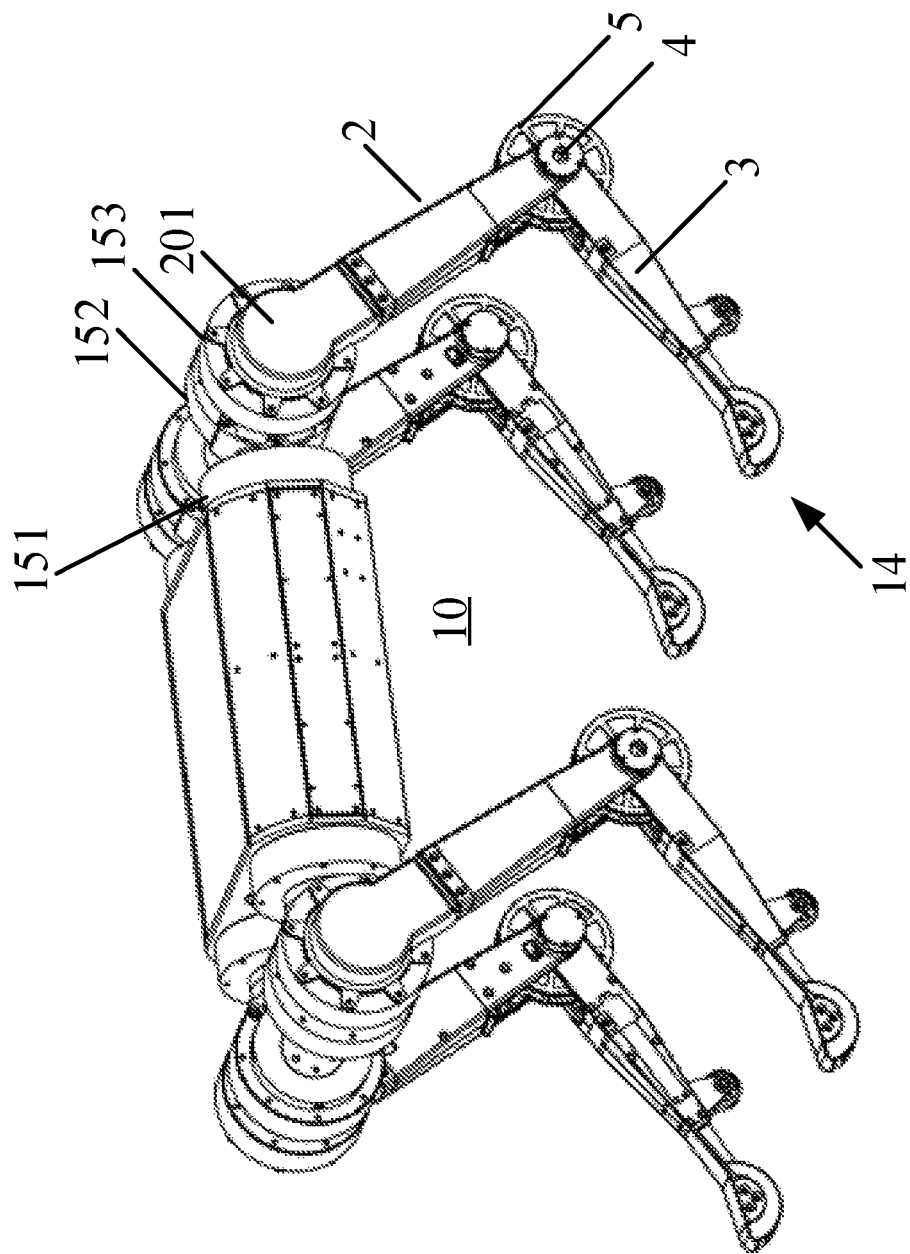
FIG. 2 is a schematic diagram of a robot in a footed mode according to an exemplary embodiment of this application.

The number of the wheel-footed bimodal mechanical legs 14 of the robot 10 may be two, three, four, six, etc., and the present application does not limit the number of the wheel-footed bimodal mechanical legs 14. An example in which the quantity of the wheel-footed bimodal mechanical legs 14 is four is used for description. FIG. 2 shows a three-dimensional view of a robot 10 according to another exemplary embodiment of this application. The robot 10 includes: a body part 12, and 4 wheel-footed bimodal mechanical legs 14 connected to the body part 12.

Figure 3:
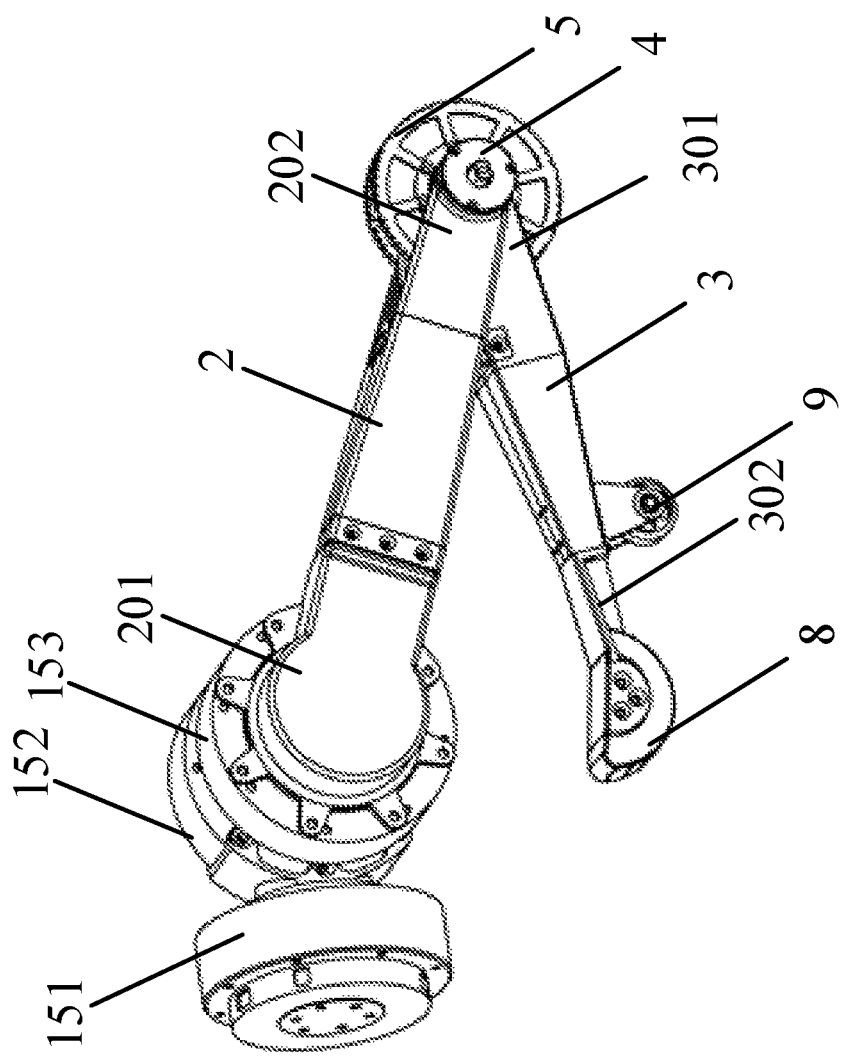
FIG. 3 is a three-dimensional view of a mechanical leg according to an exemplary embodiment of this application.

Referring to FIG. 3, for each wheel-footed bimodal mechanical leg 14, the wheel-footed bimodal mechanical leg 14 includes a driving apparatus 1, a thigh unit 2, and a calf unit 3.

The driving apparatus 1 includes at least one of a first thigh driving apparatus 151, a second thigh driving apparatus 152, or a calf driving apparatus 153. Exemplarily, the first thigh driving apparatus 151, the second thigh driving apparatus 152, and the calf driving apparatus 153 constitute a combined driving apparatus. The calf driving apparatus 153 is further connected to a root end 201 of the thigh unit 2. A joint end 202 of the thigh unit 2 is connected to a joint end 301 of the calf unit 3. An auxiliary wheel 9 is disposed on a side surface of the calf unit 3 close to the ground (referred to as a near-ground side). A sole portion 8 is disposed at an end 22 of the calf unit 3.

Exemplarily, the first thigh driving apparatus 151, the second thigh driving apparatus 152, and the calf driving apparatus 153 are all motors. Each motor includes a stator portion and a rotor portion. The rotor portion can rotate relative to the stator portion.

Figure 4:
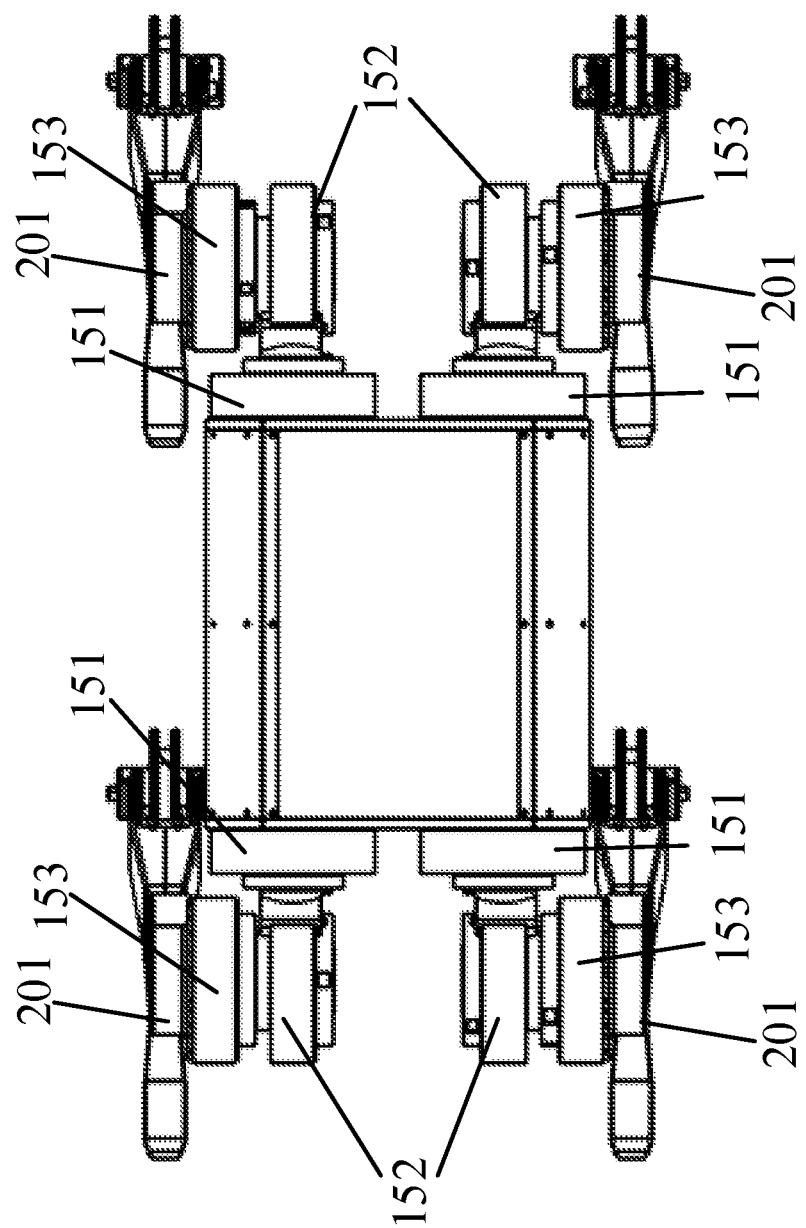
FIG. 4 is a top view of a robot in a footed mode according to an exemplary embodiment of this application.
Figure 5:
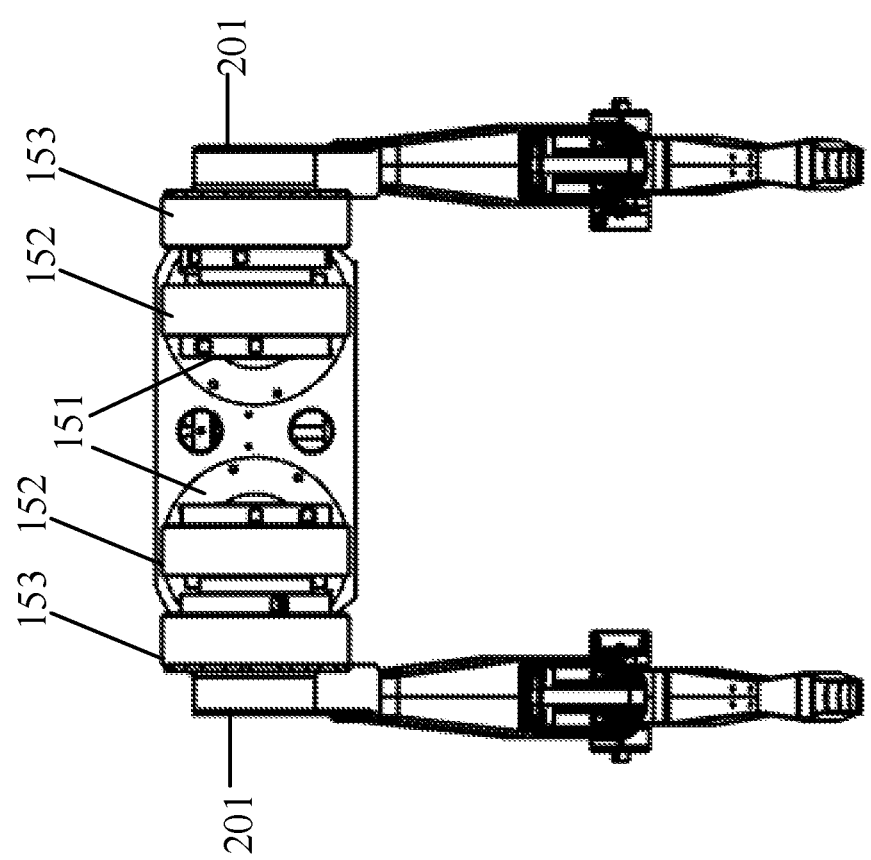
FIG. 5 is a side view of a robot in a footed mode according to an exemplary embodiment of this application.

Referring to FIG. 4 and FIG. 5 in combination, FIG. 4 is a top view of the robot 10, and FIG. 5 is a side view of the robot 10.

The first thigh driving apparatus 151 is configured to drive the thigh unit 2 to rotate along two sides of the body part 12. A first stator portion of the first thigh driving apparatus 151 is connected to the body part 12. A first rotor portion of the first thigh driving apparatus 151 is connected to a side surface of a second stator portion of the second thigh driving apparatus 152. In some embodiments, a central axis of a first rotor portion is parallel to a central axis of the body part 12.

The second thigh driving apparatus 152 is configured to drive the thigh unit 2 to swing along the front/rear of the body part 12. A second rotor portion of the second thigh driving apparatus 152 is connected to a third stator portion of the calf driving apparatus 153. In some embodiments, the second rotor portion faces an outer side of the body part 12. The second stator portion faces an inner side of the body part 12. A central axis of the second rotor portion is perpendicular to the central axis of the body part 12.

The third stator portion of the calf driving apparatus 153 is connected to the root end 201 of the thigh unit 2. A third rotor portion of the calf driving apparatus 153 is connected to the rotary shaft 4 by a transmission apparatus. In some embodiments, a central axis of the third rotor portion coincides with or is parallel to the central axis of the second rotor portion.

In some embodiments, the robot 10 has at least three movement modes (e.g., motion modes): a footed mode, a first wheeled mode, and a second wheeled mode.

Footed Mode:

In a footed mode shown in FIG. 2, the calf unit 3 and the rotary shaft 4 in each wheel-footed bimodal mechanical leg 14 are fixedly connected to each other. The second rotor portion of the second thigh driving apparatus 152 drives the thigh unit 2 to swing along the front/rear of the body part 12. The third rotor portion of the calf driving apparatus 153 rotates, and drives the traveling wheel 5 and the calf unit 3 through the rotary shaft 4 to travel in the footed movement mode. When the calf driving apparatus 153 drives the traveling wheel 5 through the rotary shaft 4 to rotate forward, the calf unit 3 is also driven to rotate forward. When the calf driving apparatus 153 drives the traveling wheel 5 through the rotary shaft 4 to rotate backward, the calf unit 3 is also driven to rotate backward. The footed movement can be implemented by repeatedly performing the foregoing process.

Figure 6:
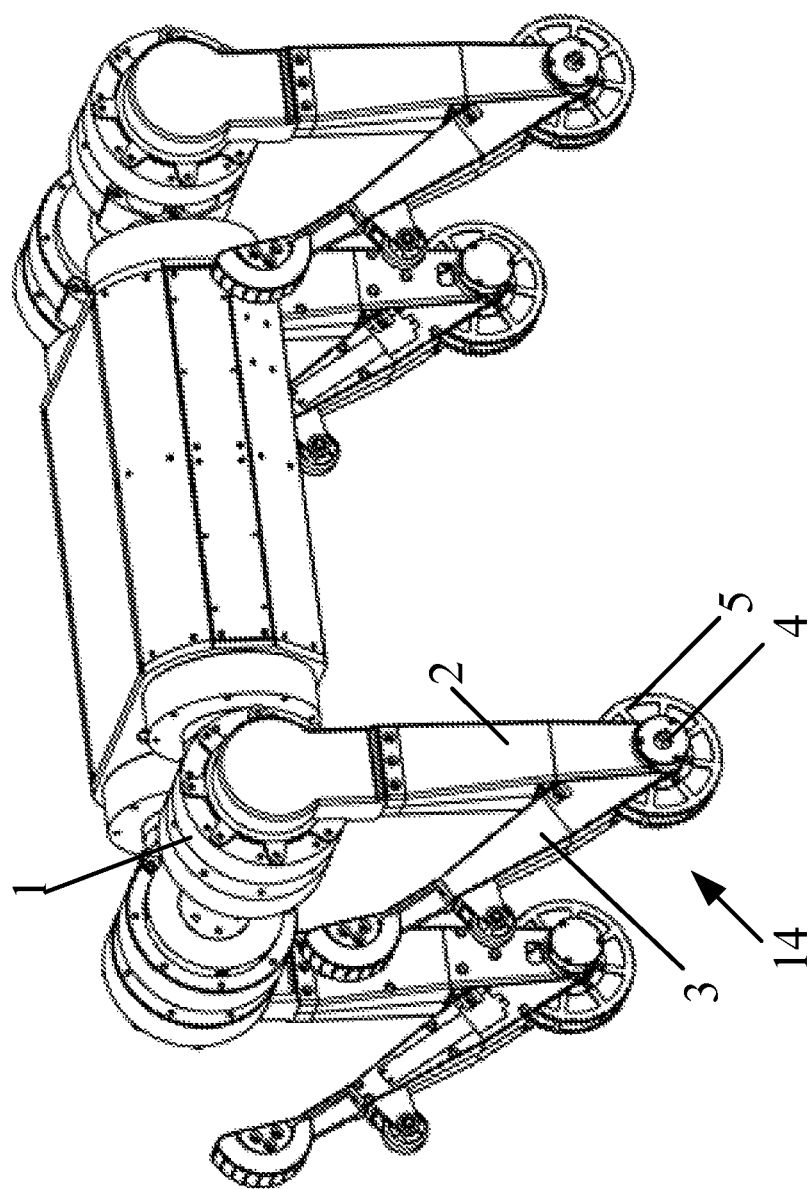
FIG. 6 is a three-dimensional view of a robot in a first wheeled mode according to an exemplary embodiment of this application.

First Wheeled Mode:

In a first wheeled mode shown in FIG. 6, the calf unit 3 and the rotary shaft 4 in each wheel-footed bimodal mechanical leg 14 are rotatably connected to each other. The calf driving apparatus 153 drives the traveling wheel 5 through the rotary shaft 4 to rotate without driving the calf unit 3 to rotate.

Figure 7:
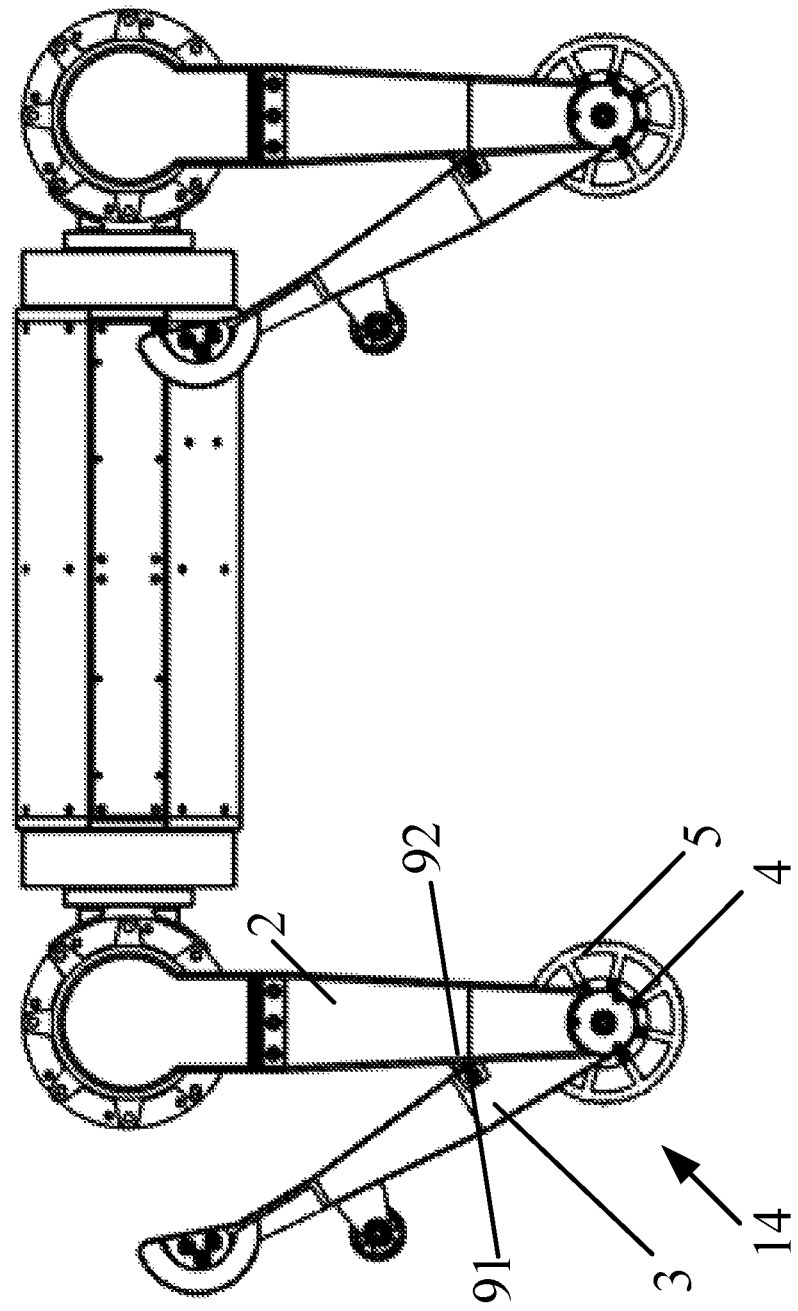
FIG. 7 is a front view of a robot in a first wheeled mode according to an exemplary embodiment of this application.

In an exemplary design, as shown in FIG. 7, the calf unit 3 may include a first magnetic component 91 thereon, and the thigh unit 2 may include a second magnetic component 92 thereon. One of the first magnetic component 91 and the second magnetic component 92 is a magnet, and the other of the first magnetic component 91 and the second magnetic component 92 is a magnet or an iron block.

In the first wheeled mode, the first magnetic component 91 may be attracted to the second magnetic component 92. Exemplarily, when the calf unit 3 and the thigh unit 2 are in a contracted and closed state, the calf unit 3 and the thigh unit 2 are fixed by a magnetic force between the magnetic components, thereby reducing interference of the calf unit 3 in the first wheeled mode. When the calf unit 3 and the thigh unit 2 are in the contracted and closed state, the end of the calf unit 3 faces upward, so that the body part 12 has a relatively appropriate ground clearance, less wind resistance, better passing ability, and a higher passing speed. The contracted and closed state means that after the calf unit 3 is contracted in a direction of the thigh unit 2, the calf unit 3 and the thigh unit 2 are in a state of being close to each other and folded together.

Second Wheeled Mode:

An auxiliary wheel 9 is further disposed on a near-ground side of the calf unit 3. In a second wheeled mode, the calf units 3 and the rotary shafts 4 in m wheel-footed bimodal mechanical legs 14 located at a same end 02 (a front end or a rear end) of the body part 12 are rotatably connected to each other. The calf units 3 and the rotary shafts 4 in the remaining n-m wheel-footed bimodal mechanical legs 14 located at another end 04 of the body part 12 are fixedly connected to each other.

Figure 8:
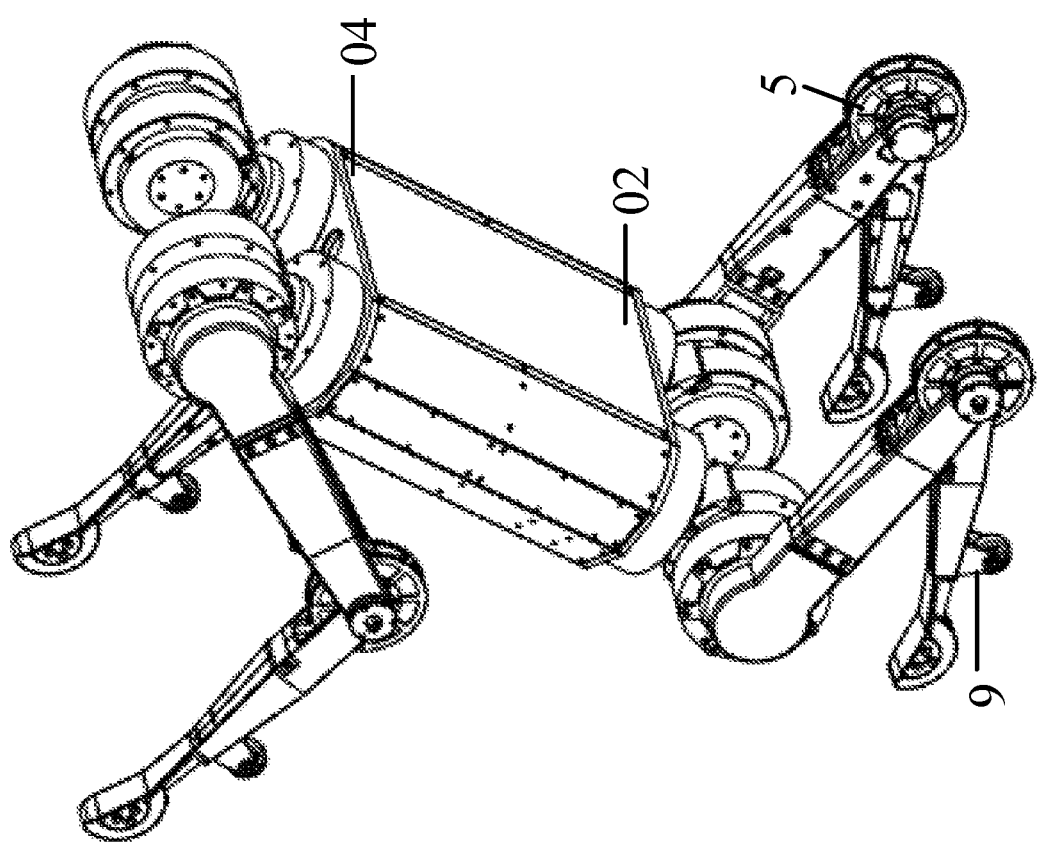
FIG. 8 is a three-dimensional view of a robot in a second wheeled mode according to an exemplary embodiment of this application.

Schematically, as shown in FIG. 8, the calf units 3 and the rotary shafts 4 in two wheel-footed bimodal mechanical legs 14 located at the rear end 02 of the body part 12 are rotatably connected to each other. The calf units 3 and the rotary shafts 4 in two wheel-footed bimodal mechanical legs 14 located at the front end 04 of the body part 12 are fixedly connected to each other.

In the second wheeled mode, the robot 10 may be supported by only 2 mechanical legs to move forward or backward in the wheeled mode. The auxiliary wheels 9 provide support and the ability to assist rolling during wheeled forward or backward movement. For example, the auxiliary wheels 9 and the traveling wheels 5 on the calf units 3 in the two wheel-footed bimodal mechanical legs 14 located at the rear end 02 of the body part 12, that is, a total of four wheels, touch the ground. The two traveling wheels 5 move under the driving of a driving force. The two auxiliary wheels 9 move with the movement of the traveling wheels 5. The two traveling wheels 5 and the two auxiliary wheels 9 provide four force application points to ensure the stability of the robot 10 during traveling.

In the second wheeled mode, the calf units 3 and the thigh units 2 in the two wheel-footed bimodal mechanical legs 14 located at the rear end 02 of the body part 12 may be attracted to each other through the magnetic components.

The robot 10 performs wheeled forward or backward movement through the two wheel-footed bimodal mechanical legs 14 located at the rear end 02 of the body part 12. During the wheeled forward or backward movement, the robot 10 may further perform other actions, such as opening a door, transporting an object, or photographing, etc., through the two wheel-footed bimodal mechanical legs 14 located at the front end 04 of the body part 12.

It can be seen from the foregoing embodiments that, for the foregoing wheel-footed bimodal mechanical leg, the calf unit 3 and the rotary shaft 4 may be switched between a fixed connection and a rotatable connection, or, in other words, switched between a fixed state and a rotatable state or switched between the footed mode and the wheeled mode.

In some embodiments, the calf unit 3 includes a locking component 7 (or a pin component 7, or a latch member) therein. The locking component 7 is configured to implement the switching between the fixed connection and the rotatable connection.

Figure 9:
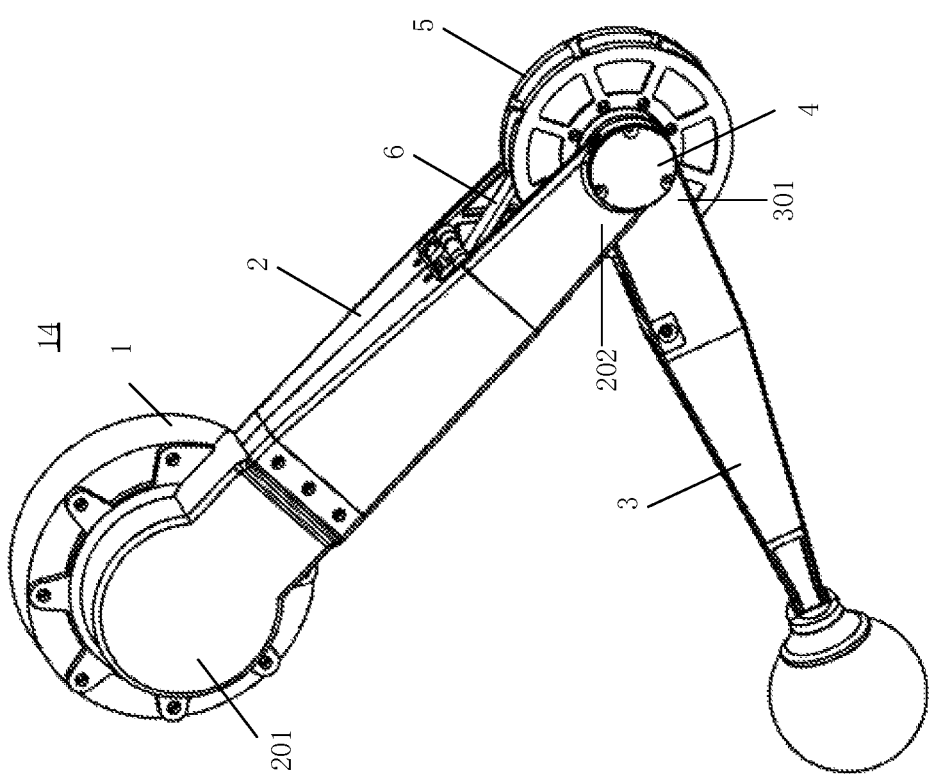
FIG. 9 is a three-dimensional view of a wheel-footed bimodal mechanical leg according to an exemplary embodiment of this application.

FIG. 9 is a schematic diagram of a wheel-footed bimodal mechanical leg 14 according to an exemplary embodiment of this application. The mechanical leg includes a driving apparatus 1, a thigh unit 2, and a calf unit 3.

A root end 201 of the thigh unit 2 is connected to the driving apparatus 1. A joint end 202 of the thigh unit 2 is hingedly connected (e.g., hinged) to a joint end 301 of the calf unit 3 by a rotary shaft 4. The rotary shaft 4 is transmission-connected to a traveling wheel 5. The driving apparatus 1 is connected to the traveling wheel 5 by a transmission apparatus 6. Exemplarily, a traveling wheel 5 is fixed on at least one position of two ends or a middle position of the rotary shaft 4. There may be one or more traveling wheels 5.

Figure 10:
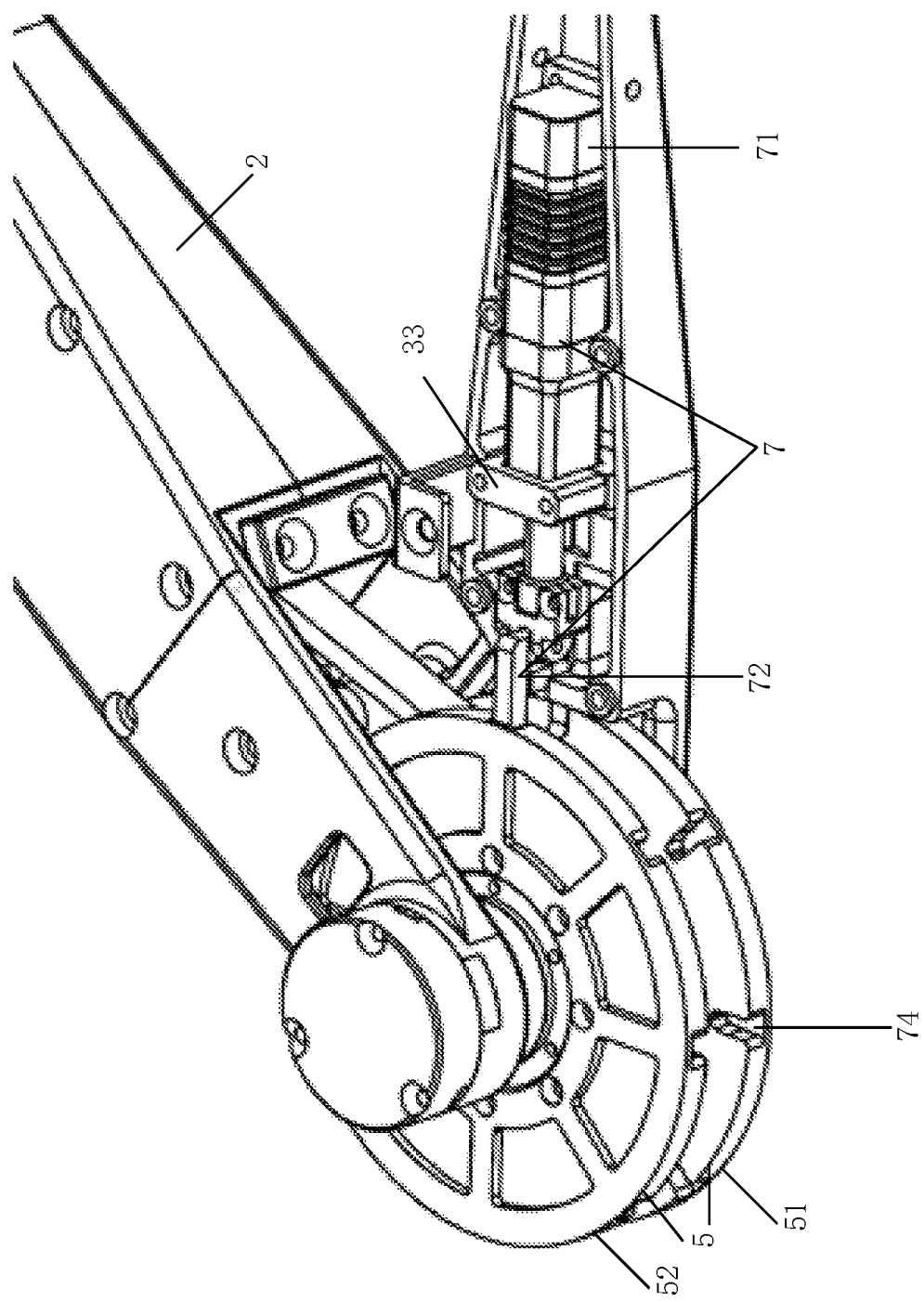
FIG. 10 is a schematic diagram of a locking component according to an exemplary embodiment of this application.
Figure 15:
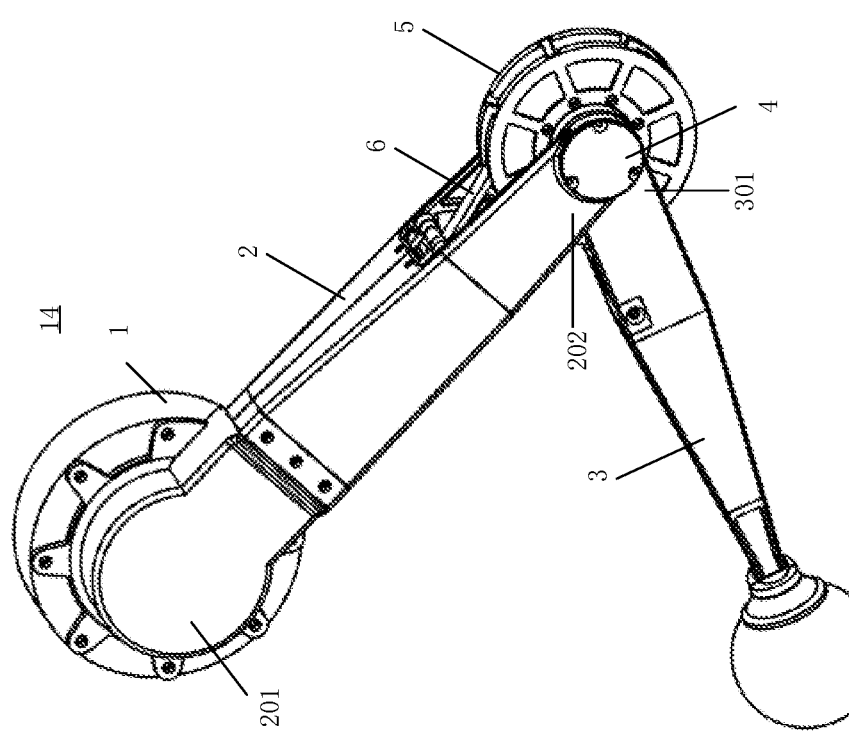
FIG. 15 is a three-dimensional view of a mechanical leg according to an exemplary embodiment of this application.

The calf unit 3 includes a locking component (not shown in FIG. 9, refer to FIG. 10 or FIG. 15).

When the locking component is in a locked state, the calf unit 3 and the traveling wheel 5 are locked to each other. The calf unit 3 is fixedly connected to the rotary shaft 4 by the traveling wheel 5, so that the driving apparatus 1 drives the traveling wheel 5 and the calf unit 3 through the rotary shaft 4 to travel in the footed movement mode.

When the locking component is in an unlocked state, the calf unit 3 and the traveling wheel 5 are unlocked from each other. The calf unit 3 is rotatably connected to the rotary shaft 4, so that the driving apparatus 1 drives the traveling wheel 5 through the rotary shaft 4 to travel in the wheeled movement mode without driving the calf unit 3 to move.

The working principles of the foregoing wheel-footed bimodal mechanical leg 14 include:

When the locking component is in the locked state, the calf unit 3 is fixedly connected to the rotary shaft 4 through the traveling wheel 5. When the driving apparatus 1 drives the traveling wheel 5 through the rotary shaft 4 to rotate forward, the calf unit 3 is also driven to rotate forward. When the driving apparatus 1 drives the traveling wheel 5 through the rotary shaft 4 to rotate backward, the calf unit 3 is also driven to rotate backward. The footed movement can be implemented by repeatedly performing the foregoing process.

When the locking component is in the unlocked state, the calf unit 3 is rotatably connected to the rotary shaft 4. That is, the rotary shaft 4 and the traveling wheel 5 can freely rotate relative to the calf unit 3. The driving apparatus 1 drives the traveling wheel 5 through the rotary shaft 4 to rotate forward, thereby implementing the wheeled movement.

Based on the above, in the wheel-footed bimodal mechanical leg provided in this embodiment, the locking component is arranged in the calf unit, so that the calf unit and the traveling wheel are locked to each other when the locking component is in the locked state. The calf unit is fixedly connected to the rotary shaft by the traveling wheel, so that the driving apparatus drives the traveling wheel through the rotary shaft to drive the calf unit to travel in the footed mode. When the locking component is in the unlocked state, the calf unit and the traveling wheel are unlocked from each other. The calf unit is rotatably connected to the rotary shaft, so that the driving apparatus drives the traveling wheel through the rotary shaft to travel in the wheeled mode. In this application, only one driving apparatus is needed to implement the wheel-footed bimodal mechanical leg, which simplifies the structure of the mechanical leg, and is beneficial to the miniaturization and portability of the mechanical leg.

There are at least two implementations for the design of the locking component 7:

First implementation: The locking component 7 includes a flat pin, and a pin hole is designed on the traveling wheel 5, as shown in FIG. 10.

Second implementation: The locking component 7 includes a double-shaft pin. The pin hole is designed on the rotary shaft 4, as shown in FIG. 15.

For the first implementation of the locking component 7: The pin hole is designed on the traveling wheel 5.

FIG. 10 is a structural diagram of a locking component 7 according to an exemplary embodiment of this application. The locking component 7 is configured for locking or unlocking between the calf unit 3 and traveling wheel 5. The locking component 7 includes a linear motor 71 and a flat pin 72.

The linear motor 71 is a transmission apparatus that converts electrical energy into mechanical energy for a linear movement. In some embodiments, the calf unit 3 includes a motor fixing base 33 therein. The motor fixing base 33 fixes the linear motor 71 to an inner wall of the calf unit 3.

The flat pin 72 is fixed to an output end of the linear motor 71. The traveling wheel 5 includes at least one pin groove 74 thereon. The flat pin 72 is inserted into the pin groove 74 or pulled out from the pin groove 74 under the driving of the linear motor 71.

Figure 11:
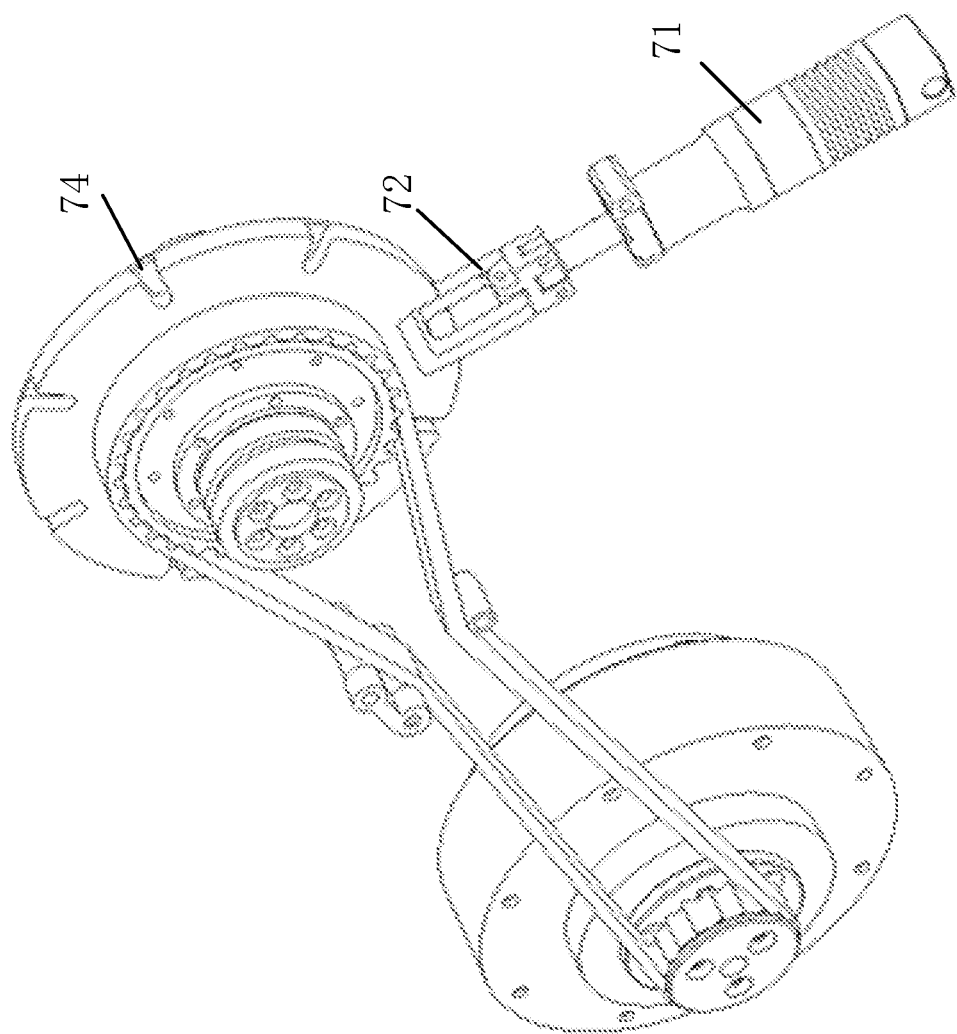
FIG. 11 is a schematic diagram of a locking component in a locked state according to an exemplary embodiment of this application.

The locking component 7 is in the locked state when the flat pin 72 is inserted into the pin groove 74. The calf unit 3 and the traveling wheel 5 are locked to each other. The calf unit 3 is fixedly connected to the rotary shaft 4 by the traveling wheel 5, as shown in FIG. 11. When the rotary shaft 4 drives the traveling wheel 5 to rotate, the calf unit 3 also rotates with the traveling wheel 5.

When the flat pin 72 is pulled out from the pin groove 74, the locking component 7 is in the unlocked state. The calf unit 3 and the traveling wheel 5 are unlocked from each other. The calf unit 3 is rotatably connected to the rotary shaft 4. When the rotary shaft 4 drives the traveling wheel 5 to rotate, the calf unit 3 does not rotate with the traveling wheel 5.

In some embodiments, there are at least two pin grooves 74. Each pin groove 74 is distributed along a radial direction of the traveling wheel 5. That is, the traveling wheel 5 includes at least two pin grooves 74 distributed in the radial direction thereon. The at least two pin grooves 74 may be uniformly distributed or non-uniformly distributed.

In some embodiments, the traveling wheel 5 includes at least one traveling wheel. An example in which the traveling wheel includes a first traveling wheel 51 and a second traveling wheel 52 is used for description in this embodiment. The first traveling wheel 51 and the second traveling wheel 52 are relatively fixed. The pin groove 74 is formed on a first wheel surface of the first traveling wheel 51 facing the second traveling wheel 52. The pin groove 74 is formed on a second wheel surface of the second traveling wheel 52 facing the first traveling wheel 51. The number and grooving positions (e.g., slot positions) of the pin grooves 74 on the first wheel surface and the second wheel surface are the same.

Based on the above, the locking component provided in this embodiment is locked by inserting the flat pin 72 into the pin groove 74 of the traveling wheel 5 under the driving of the linear motor 71, and is unlocked by pulling the flat pin 72 out from the pin groove 74 of the traveling wheel 5 under the driving the linear motor 71. The linear motor 71 is hidden inside the calf unit 3, so that the structure is relatively simple, which can better ensure the miniaturization and portability of the calf unit 3.

Figure 12:
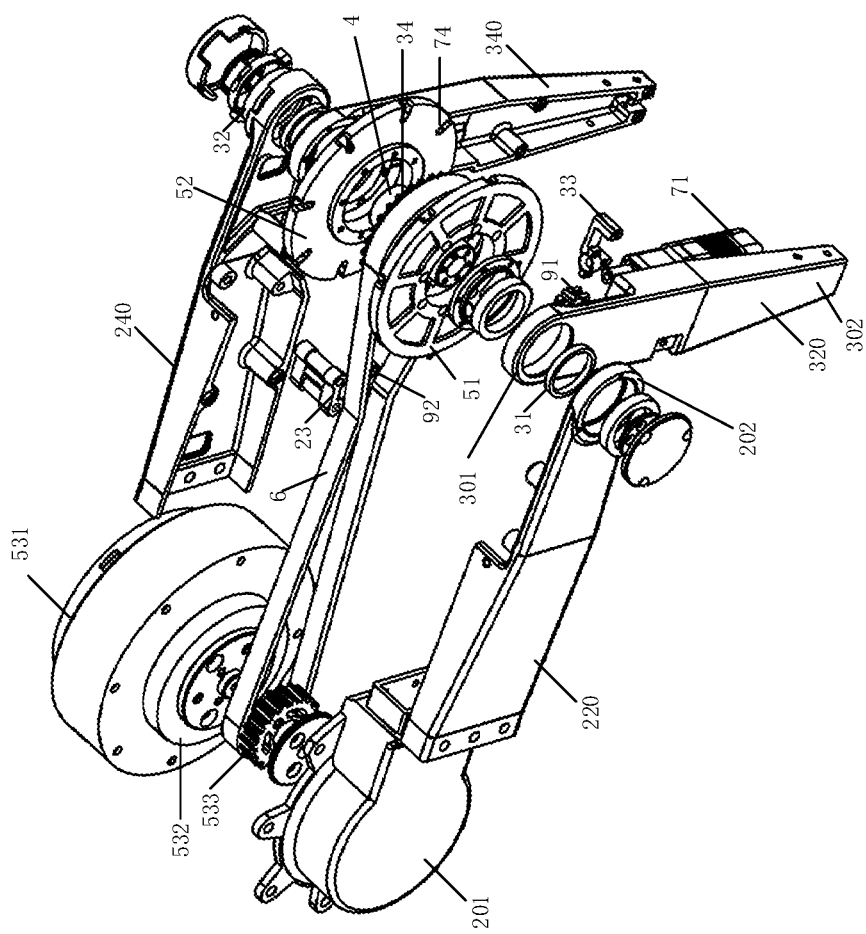
FIG. 12 is a three-dimensional exploded view of a wheel-footed bimodal mechanical leg according to an exemplary embodiment of this application.
Figure 13:
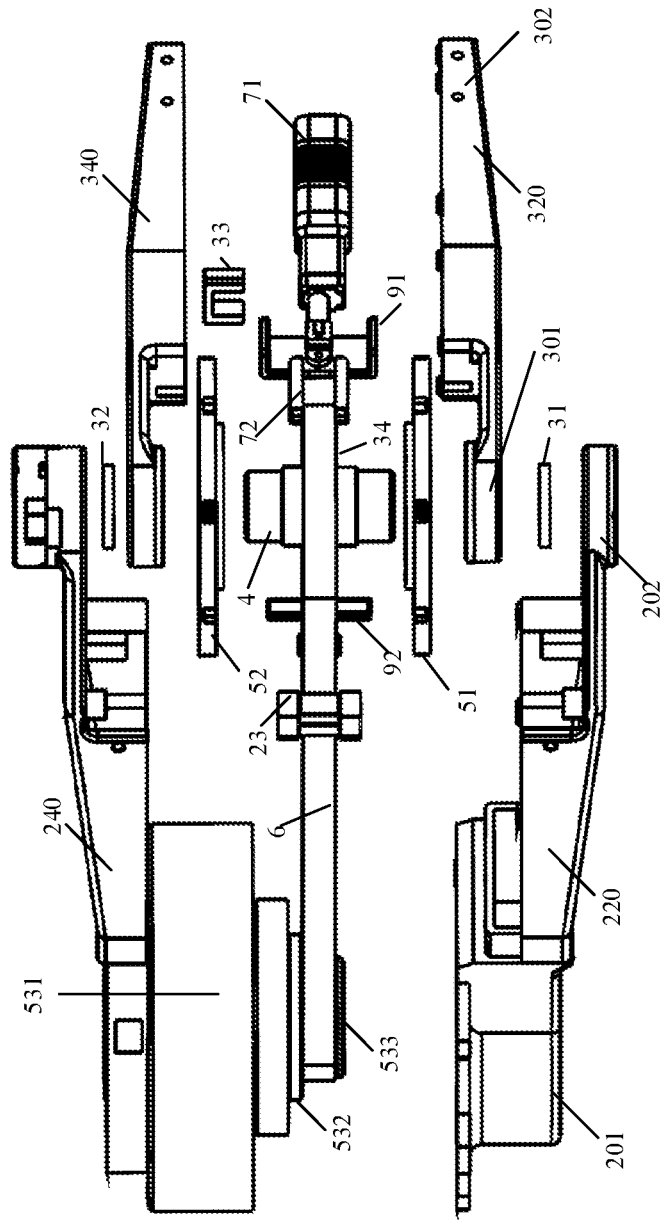
FIG. 13 is a top exploded view of a wheel-footed bimodal mechanical leg according to an exemplary embodiment of this application.

FIG. 12 and FIG. 13 are respectively exploded views of a wheel-footed bimodal mechanical leg 14 according to another exemplary embodiment of this application from two viewing angles. The wheel-footed bimodal mechanical leg 14 includes at least a driving apparatus 1, a thigh unit 2, a calf unit 3, a rotary shaft 4, a traveling wheel 5, a transmission apparatus 6, and a locking component 7.

The driving apparatus 1 includes a third stator portion 531 and a third rotor portion 532. The third stator portion 531 is configured to provide a rotational driving force. A transmission wheel 533 is fixed to an output end of the third rotor portion 532. The transmission wheel 533 is connected to the transmission apparatus 6. The transmission apparatus 6 is a belt or a chain. An example in which the transmission apparatus 6 is the belt is used for description in this embodiment. In some embodiments, a gear is further formed on a surface of the transmission wheel 533 to increase a transmission force between the transmission wheel 533 and the belt.

A root end 201 of the thigh unit 2 is fixed to the third stator portion 531. A joint end 202 of the thigh unit 2 is hingedly connected to a joint end 301 of the calf unit 3 by the rotary shaft 4. In some embodiments, the thigh unit 2 includes a first thigh portion 220 and a second thigh portion 240 that are detachably connected to each other. The first thigh portion 220 and the second thigh portion 240 are in a plugged connection, or are connected by using a screw or a nut. The first thigh portion 220 and the second thigh portion 240 enclose a casing portion of the thigh unit 2, and form an inner accommodation cavity of the thigh unit 2. In some embodiments, the first thigh portion 220 is located on a first side of the transmission apparatus 6. The second thigh portion 240 is located on a second side of the transmission apparatus 6. For example, the first thigh portion 220 is located on an outer side of the transmission apparatus 6. The second thigh portion 240 is located on an inner side of the transmission apparatus 6. In some embodiments, the thigh unit 2 further includes a belt pressing apparatus 23 inside. The belt pressing apparatus 23 is in pressing contact with an outer surface of the belt.

The calf unit 3 includes a first calf portion 320 and a second calf portion 340 that are detachably connected to each other. The first calf portion 320 and the second calf portion 340 are in plugged connection, or are connected by using a screw or a nut. The first calf portion 320 and the second calf portion 340 enclose a casing portion of the calf unit 3, and form an inner accommodation cavity of the calf unit 3. In some embodiments, the first calf portion 320 is located on a first side of the transmission apparatus 6. The second calf portion 340 is located on a second side of the transmission apparatus 6. Referring to FIG. 3, the first calf portion 320 is located on an outer side of the transmission apparatus 6, and the second calf portion 340 is located on an inner side of the transmission apparatus 6. Referring to FIG. 3, an end 22 of the calf unit 3 is configured to connect a sole portion 8. The material of the sole portion 8 may be a wear-resistant material such as rubber or wood. In some embodiments, the sole portion 8 is in a semicircular hoof shape. In some other embodiments, the sole portion 8 is spherical.

Schematically, the first thigh portion 220, the second thigh portion 240, the first calf portion 320, and the second calf portion 340 are sleeved on the rotary shaft 4 through bearings. A first spacer 31 is further sleeved between the first thigh portion 220 and the first calf portion 320. The first spacer 31 is configured to separate a bearing inner ring of the bearing corresponding to the first thigh portion 220 from a bearing inner ring of the bearing corresponding to the first calf portion 320, to avoid direct friction between the two. A second spacer 32 is further sleeved between the second thigh portion 240 and the second calf portion 340. The second spacer 32 is configured to separate a bearing inner ring of the bearing corresponding to the second thigh portion 240 from a bearing inner ring of the bearing corresponding to the second calf portion 340, to avoid direct friction between the two. In addition, the first spacer 31 and the second spacer 32 also play an axial positioning role.

Exemplarily, the joint end 301 of the calf unit 3 is clamped between the first thigh portion 220 and the second thigh portion 240. The rotary shaft 4 is clamped between the first calf portion 320 and the second calf portion 340. The traveling wheel 5 is clamped between the first calf portion 320 and the second calf portion 340.

The traveling wheel 5 includes a first traveling wheel 51 and a second traveling wheel 52. The first traveling wheel 51 and the second traveling wheel 52 and the driving wheel 34 are fixedly connected. Illustratively, the traveling wheel includes the first traveling wheel 51 and the second traveling wheel 52. The pin groove 74 is formed on a first wheel surface of the first traveling wheel 51 facing the second traveling wheel 52. The pin groove 74 is formed on a second wheel surface of the second traveling wheel 52 facing the first traveling wheel 51. The number and grooving positions of the pin grooves 74 on the first wheel surface and the second wheel surface are the same. In some embodiments, there are at least two pin grooves 74. Each pin groove 74 is distributed along a radial direction of the traveling wheel 5. That is, the traveling wheel 5 includes at least two pin grooves 74 distributed in the radial direction thereon. The at least two pin grooves 74 may be uniformly distributed or non-uniformly distributed. In some other embodiments, the number of traveling wheels 5 may be one, or more than three, which is not limited in this application.

Figure 14:
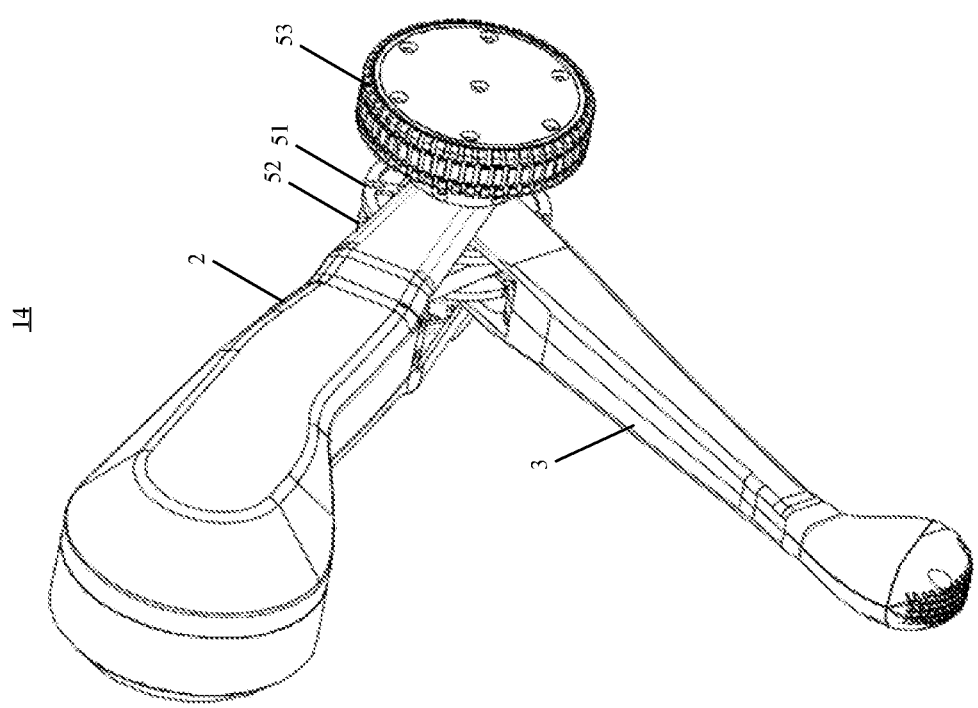
FIG. 14 is a three-dimensional view of a mechanical leg according to an exemplary embodiment of this application.

In some other embodiments, the traveling wheel 5 may alternatively be disposed an outer side of a joint of the joint end 301 relative to the robot 10, or disposed an inner side of the joint of the joint end 301 relative to the robot 10. As shown in FIG. 14, in addition to the first traveling wheel 51 and the second traveling wheel 52, the traveling wheel 5 further includes a third traveling wheel 53 located on the outer side of the joint. A wheel diameter of a third traveling wheel 53 is the same as or different from that of the first traveling wheel 51 (and/or the second traveling wheel 52).

A driving wheel 34 is further fixed to the rotary shaft 4. Schematically, the driving wheel 34 is located between the first traveling wheel 51 and the second traveling wheel 52. The driving wheel 34 is connected to the transmission wheel 533 by the transmission apparatus 6. Using an example in which the transmission apparatus 6 is a belt, the driving wheel 34 is connected to the transmission wheel 533 by the belt. When the third rotor portion 532 of the calf driving apparatus 153 rotates, the transmission wheel 533 also rotates. The driving wheel 533 drives the driving wheel 34 to rotate through the belt. The driving wheel 34 drives the rotary shaft 4 and the traveling wheel 5 to rotate simultaneously, thereby transmitting a driving force.

The inner accommodating cavity of the calf unit 3 further includes a locking component 7 therein. The locking component 7 is configured to lock or unlock the calf unit 3 and the traveling wheel 5, to switch between the wheeled mode and the footed mode. In some embodiments, the locking component 7 includes a linear motor 71 and a flat pin 72.

The linear motor 71 is a transmission apparatus that converts electrical energy into mechanical energy for a linear movement. In some embodiments, the calf unit 3 includes a motor fixing base 33 therein. The motor fixing base 33 fixes the linear motor 71 to an inner wall of the calf unit 3.

The flat pin 72 is fixed to an output end of the linear motor 71. The traveling wheel 5 includes at least one pin groove 74 thereon. The flat pin 72 is inserted into the pin groove 74 or pulled out from the pin groove 74 under the driving of the linear motor 71.

The locking component 7 is in the locked state when the flat pin 72 is inserted into the pin groove 74. The calf unit 3 and the traveling wheel 5 are locked. The calf unit 3 is fixedly connected to the rotary shaft 4 by the traveling wheel 5, as shown in FIG. 4. When the rotary shaft 4 drives the traveling wheel 5 to rotate, the calf unit 3 also rotates with the traveling wheel 5.

When the flat pin 72 is pulled out from the pin groove 74, the locking component 7 is in the unlocked state. The calf unit 3 and the traveling wheel 5 are unlocked. The calf unit 3 is rotatably connected to the rotary shaft 4. When the rotary shaft 4 drives the traveling wheel 5 to rotate, the calf unit 3 does not rotate with the traveling wheel 5.

Regardless of whether the locking component 7 is in a locked state or an unlocked state, the thigh unit 2 and the rotary shaft 4 are always rotatably connected. The traveling wheel 5 can rotate forward or backward relative to the thigh unit 2.

Schematically, the calf unit 3 includes a first magnetic component 91 thereon, and the thigh unit 2 includes a second magnetic component 92 thereon. When the locking component 7 is in the locked state, and the thigh unit 2 and the calf unit 3 are in a contracted and closed state, the first magnetic component 91 and the second magnetic component 92 are attracted to each other, so that the thigh unit 2 and the calf unit 3 keep the contracted and closed state during the wheeled movement, to avoid the calf unit 3 from shaking in a bumping process and affecting a movement posture of the robot 10. The contracted and closed state means that, after the calf unit 3 is contracted in a direction of the thigh unit 2, the calf unit 3 and the thigh unit 2 are in a state of being close to each other and folded together. One of the first magnetic component 91 and the second magnetic component 92 is a magnet, and the other of the first magnetic component 91 and the second magnetic component 92 is a magnet or an iron block. In this embodiment, an example in which the first magnetic component 91 is a magnet and the second magnetic component 92 is an iron block is used for description. In some embodiments, a magnetic attraction force between the first magnetic component 91 and the second magnetic component 92 is smaller than a maximum driving force provided by the calf driving apparatus 153.

Based on the above, in the wheel-footed bimodal mechanical leg provided in this embodiment, the locking component is arranged in the calf unit, so that the calf unit and the traveling wheel are locked to each other when the locking component is in the locked state. The calf unit is fixedly connected to the rotary shaft by the traveling wheel, so that the driving apparatus drives the traveling wheel through the rotary shaft to drive the calf unit to travel in the footed mode. When the locking component is in the unlocked state, the calf unit and the traveling wheel are unlocked from each other. The calf unit is rotatably connected to the rotary shaft, so that the driving apparatus drives the traveling wheel through the rotary shaft to travel in the wheeled mode. In this application, only one driving apparatus is needed to implement bimodal driving of the wheel-footed bimodal mechanical leg, which simplifies the structure of the wheel-footed bimodal mechanical leg, and is beneficial to the miniaturization and portability of the wheel-footed bimodal mechanical leg.

The locking component provided in this embodiment is locked by inserting the flat pin into the pin groove of the traveling wheel under the driving of the linear motor, and is unlocked by pulling the flat pin out from the pin groove of the traveling wheel under the driving of the linear motor. The linear motor is hidden inside the calf unit, so that the structure is relatively simple, which can better ensure the miniaturization and portability of the calf unit.

A belt pressing apparatus provided in this embodiment can ensure that the belt in the transmission apparatus is kept in a pressed state, thereby ensuring the driving force applied by the driving apparatus to the traveling wheel.

The first magnetic component and the second magnetic component provided in this embodiment can fix the thigh unit and the calf unit when the wheel-footed bimodal mechanical leg is in the wheeled mode, so that the calf unit does not affect normal traveling of the traveling wheel.

For the second implementation: The pin hole is designed on the rotary shaft 4.

FIG. 15 is a schematic diagram of a wheel-footed bimodal mechanical leg 14 according to an exemplary embodiment of this application. The wheel-footed bimodal mechanical leg includes a driving apparatus 1, a thigh unit 2, and a calf unit 3.

A root end 201 of the thigh unit 2 is connected to the driving apparatus 1. A joint end 202 of the thigh unit 2 is hingedly connected to a joint end 301 of the calf unit 3 by a rotary shaft 4. The rotary shaft 4 is transmission-connected to a traveling wheel 5. A pin hole is formed on the rotary shaft 4. The driving apparatus 1 is connected to the traveling wheel 5 by a transmission apparatus 6. Exemplarily, a traveling wheel 5 is fixed on at least one position of two ends or a middle position of the rotary shaft 4. There may be one or more traveling wheels 5.

The calf unit 3 includes a locking component. Schematically, the locking component (not shown in FIG. 14, refer to FIG. 15) is provided inside the calf unit 3.

In a first mode (or a locked state) in which the locking component is inserted into the pin hole on the rotary shaft 4, the calf unit 3 and the rotary shaft 4 are locked to each other. The calf unit 3 is fixedly connected to the rotary shaft 4, so that the calf driving apparatus 153 drives the calf unit 3 through the rotary shaft 4 to travel in the footed movement mode.

In a second mode (or an unlocked state) in which the locking component is pulled out from the pin hole on the rotary shaft 4, the calf unit 3 and the rotary shaft 4 are unlocked from each other. The calf unit 3 is rotatably connected to the rotary shaft 4, so that the calf driving apparatus 153 drives the traveling wheel 5 through the rotary shaft 4 to travel in the wheeled movement mode without driving the calf unit 3 to move.

Working principles of the foregoing wheel-footed bimodal mechanical leg 14 include:

In the first mode in which the locking component is inserted into the pin hole on the rotary shaft 4, the calf unit 3 is fixedly connected to the rotary shaft 4. When the driving apparatus 1 drives the traveling wheel 5 through the rotary shaft 4 to rotate forward, the calf unit 3 is also driven to rotate forward. When the driving apparatus 1 drives the traveling wheel 5 through the rotary shaft 4 to rotate backward, the calf unit 3 is also driven to rotate backward. The footed movement can be implemented by repeatedly performing the foregoing process.

In the second mode in which the locking component is pulled out from the pin hole on the rotary shaft, the calf unit 3 is rotatably connected to the rotary shaft 4, that is, the rotary shaft 4 and the traveling wheel 5 may freely rotate relative to the calf unit 3. The driving apparatus 1 drives the traveling wheel 5 through the rotary shaft 4 to rotate forward, thereby implementing the wheeled movement.

Based on the above, in the wheel-footed bimodal mechanical leg provided in this embodiment, the locking component is arranged in the calf unit. When the locking component is inserted into the pin hole of the rotary shaft, the calf unit and the rotary shaft are locked. The calf unit is fixedly connected to the rotary shaft, so that the driving apparatus drives the calf unit through the rotary shaft to travel in the footed mode. When the locking component is pulled out from the pin hole on the rotary shaft, the calf unit and the rotary shaft are unlocked from each other. The calf unit is rotatably connected to the rotary shaft, so that the driving apparatus drives the traveling wheel through the rotary shaft to travel in the wheeled mode. In this application, only one driving apparatus is needed to implement the wheel-footed bimodal mechanical leg, which simplifies the structure of the wheel-footed bimodal mechanical leg, and is beneficial to the miniaturization and portability of the wheel-footed bimodal mechanical leg.

Figure 16:
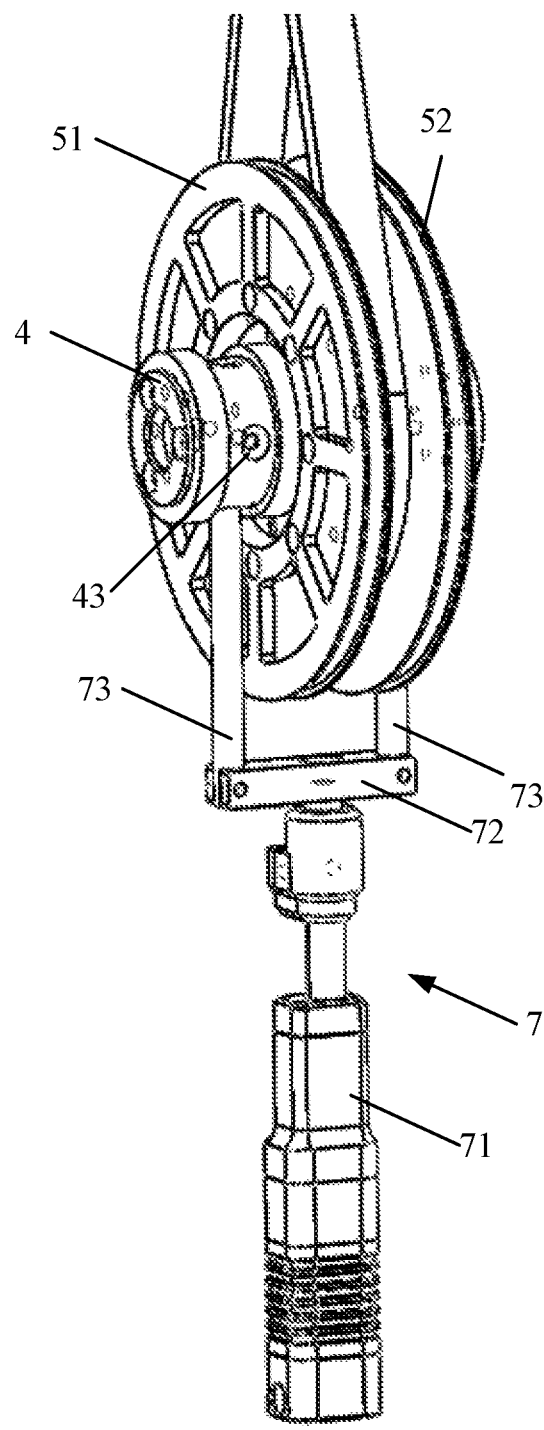
FIG. 16 is a schematic diagram of a pin component according to an exemplary embodiment of this application.

FIG. 16 is a structural diagram of a locking component 7 according to an exemplary embodiment of this application. The locking component 7 is configured to perform locking or unlocking between the calf unit 3 and rotary shaft 4. The locking component 7 includes a linear motor 71 and a flat pin 72.

The linear motor 71 is a transmission apparatus that converts electrical energy into mechanical energy for a linear movement. In some embodiments, the calf unit 3 includes a motor fixing base therein. The motor fixing base fixes the linear motor 71 to an inner wall of the calf unit 3.

The flat pin 72 is fixed to an output end of the linear motor 71. When the flat pin 72 is inserted into the pin hole 43 on the rotary shaft 4, the calf unit 3 is fixedly connected to the rotary shaft 4. When the flat pin 72 is pulled out from the pin hole 43 on the rotary shaft 4, the calf unit 3 is rotatably connected to the rotary shaft 4.

In the first mode in which the flat pin 72 is inserted into the pin hole 43, the calf unit 3 and the rotary shaft 4 are locked to each other, and the calf unit 3 is fixedly connected to the rotary shaft 4. When the rotary shaft 4 drives the traveling wheel 5 to rotate, the calf unit 3 also rotates correspondingly.

In the second mode in which the flat pin 72 is pulled out from the pin hole 43, the calf unit 3 and the rotary shaft 4 are unlocked from each other, and the calf unit 3 is rotatably connected to the rotary shaft 4. When the rotary shaft 4 drives the traveling wheel 5 to rotate, the calf unit 3 does not rotate correspondingly.

In some embodiments, at least two sets of the pin holes 4 are distributed on the rotary shaft along a radial direction. Each set of pin holes 43 includes two parallel pin holes 43. In FIG. 15, using four sets of pin holes 43 as an example, an angle between each set of pin holes 43 is 90 degrees.

In some embodiments, the flat pin 72 includes two parallel pin shafts 73. The pin shaft 73 corresponds to the pin hole. That is, a spacing (e.g., distance, separation etc.) between the two parallel pin shafts 73 is equal to a spacing between two parallel pin holes 43. An end shape of the pin shaft 73 matches the pin hole shape of the pin hole 43. At least two sets of pin holes 43 may be uniformly distributed or non-uniformly distributed along a radial direction of the rotary shaft.

In some embodiments, the traveling wheel 5 includes at least one traveling wheel. An example in which the traveling wheel 5 includes a first traveling wheel 51 and a second traveling wheel 52 is used in FIG. 15

Based on the above, the locking component provided in this embodiment is locked by inserting the flat pin 72 into the pin hole 43 of the traveling wheel 5 under the driving of the linear motor 71, and is unlocked by pulling the flat pin 72 out from the pin hole 43 of the traveling wheel 5 under the driving of the linear motor 71. The linear motor 71 is hidden inside the calf unit 3, so that the structure is relatively simple, which can better ensure the miniaturization and portability of the calf unit 3.

Figure 17:
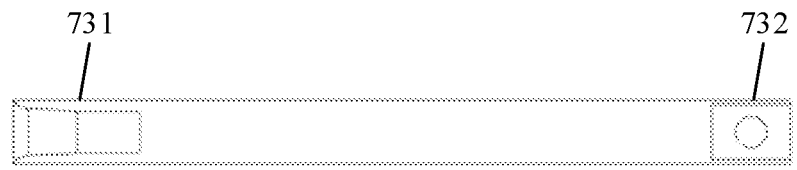
FIG. 17 is a front view of a pin shaft according to an exemplary embodiment of this application.
Figure 18:
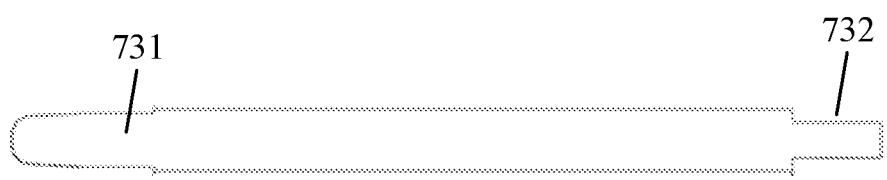
FIG. 18 is a side view of a pin shaft according to an exemplary embodiment of this application.

FIG. 17 and FIG. 18 are respectively a front view and a top view of a pin shaft 73 according to an exemplary embodiment of this application. The pin shaft 73 includes an end 731 and a fixed end 732.

An end shape of the end 731 is a first wedge shape for the end 731 to be inserted into the pin hole 43. A fixed hole is formed on the fixed end 732. The fixed end 732 is configured to be fixed on a base of the flat pin 72 of the linear motor 71. Referring to FIG. 16, the base of the flat pin 72 may include 2 parallel fixed beams. The two fixed beams clamp the fixed ends 732 of the two pin shafts 73 on the upper and lower sides, and are fixed with a rivet or a screw. Middle portions of the two fixed beams are fixed to an output end of the linear motor 71.

Figure 19:
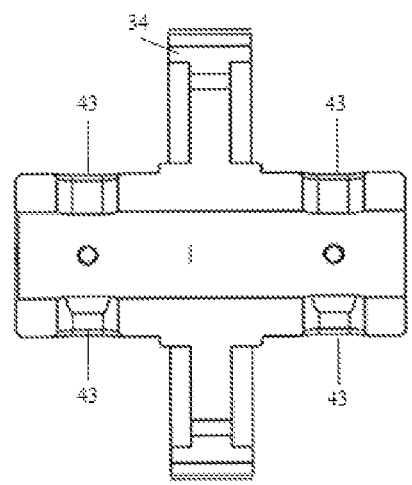
FIG. 19 is a cross-sectional view of a rotary shaft according to an exemplary embodiment of this application.
Figure 20:
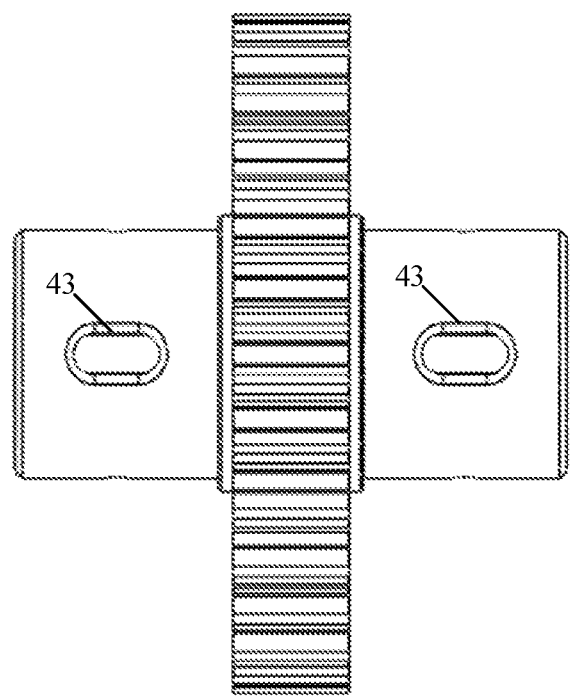
FIG. 20 is a front view of a rotary shaft according to an exemplary embodiment of this application.

FIG. 19 and FIG. 20 are respectively a cross-sectional view and a front view of a rotary shaft 4 according to an exemplary embodiment of this application. A driving wheel 34 is fixed to or formed in a middle portion of the rotary shaft 4. Four sets of pin holes 43 are formed on shaft bodies located on both sides of the driving wheel 34. Each set of pin holes 43 includes two pin holes 43. The pin holes 43 are in a shape of a second wedge shape. The first wedge shape and the second wedge shape match each other.

The pin hole shape of the pin hole 43 matches the end shape of the pin shaft 73. That is, the pin hole shape of the pin hole 43 snugly fits the end shape of the pin shaft 73.

Based on the above, the pin shaft 73 and the pin hole 43 that are provided in this embodiment and that are of wedge-shaped structures (15 and 16) that match each other can ensure that the pin shaft and the rotary shaft implement snug fitting without a gap. In this way, the robot dog does not loosen or has a gap during the wheeled or footed movement.

Figure 21:
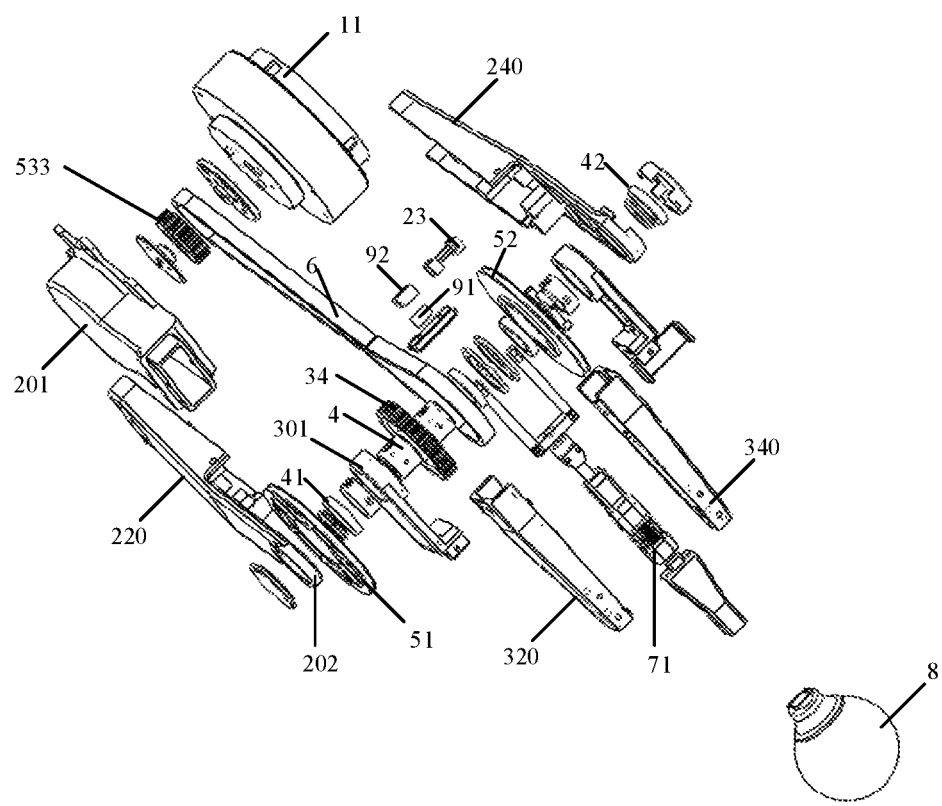
FIG. 21 is a three-dimensional exploded view of a mechanical leg according to an exemplary embodiment of this application.
Figure 22:
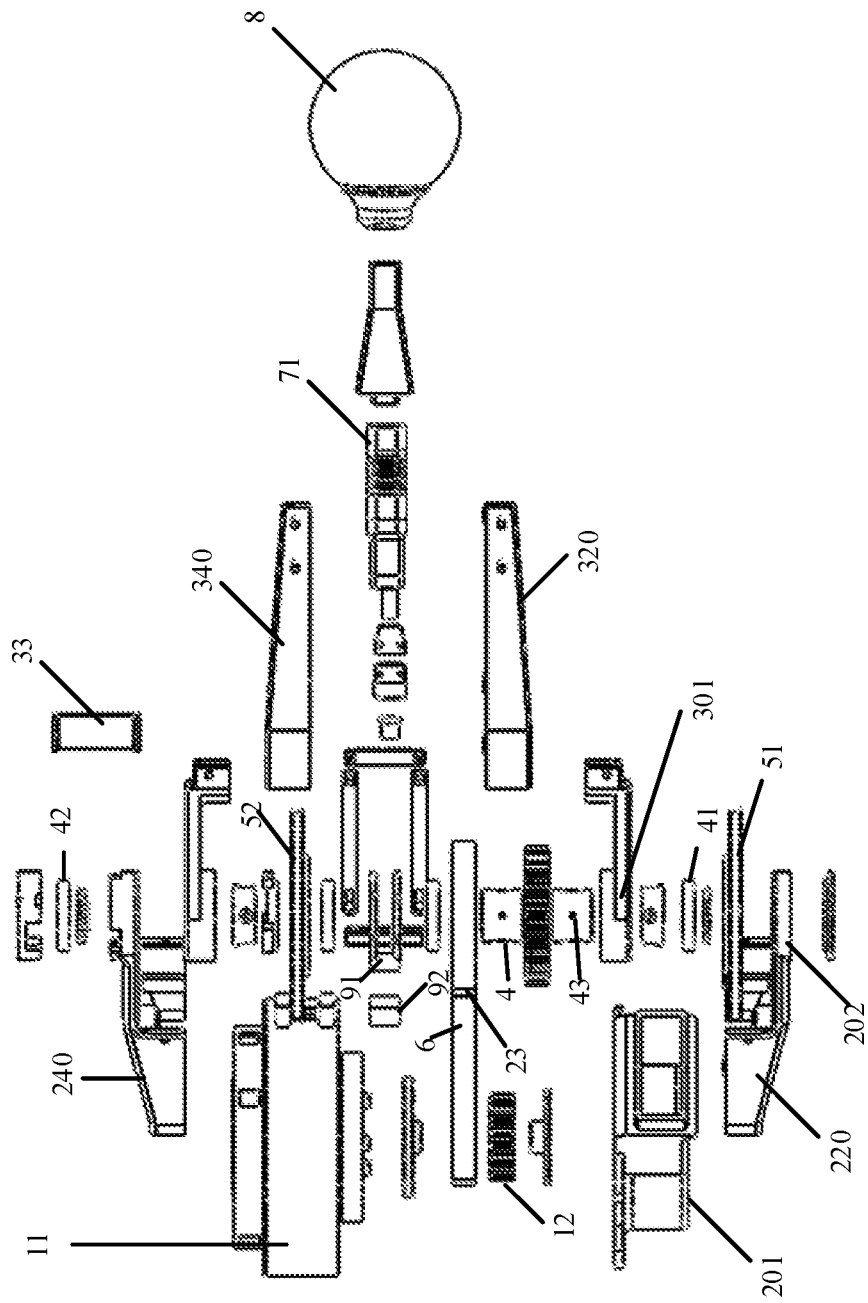
FIG. 22 is a top exploded view of a mechanical leg according to an exemplary embodiment of this application.

FIG. 21 and FIG. 22 are respectively exploded views of a wheel-footed bimodal mechanical leg 14 according to another exemplary embodiment of this application from two viewing angles. The wheel-footed bimodal mechanical leg includes: a driving apparatus 1, a thigh unit 2, a calf unit 3, a rotary shaft 4, a traveling wheel 5, a transmission apparatus 6, a locking component 7, and a sole portion 8.

The driving apparatus 1 includes a rotary motor 11 and a transmission wheel 533. The rotary motor 11 is fixedly connected to the transmission wheel 533. The rotary motor 11 is configured to provide a rotational driving force. The transmission wheel 533 is connected to the transmission apparatus 6. The transmission apparatus 6 is a belt or a chain. The belt is used as an example for description in this embodiment.

One end 201 of the thigh unit 2 is fixed to the calf driving apparatus 153. The other end 202 of the thigh unit 2 is hingedly connected to a joint end 301 of the calf unit 3 by the rotary shaft 4. In some embodiments, the thigh unit 2 includes a first thigh portion 220 and a second thigh portion 240 that are detachably connected to each other. The first thigh portion 220 and the second thigh portion 240 are in a plugged connection, or are connected by using a screw or a nut. The first thigh portion 220 and the second thigh portion 240 enclose a casing portion of the thigh unit 2, and form an inner accommodation cavity of the thigh unit 2. In some embodiments, the first thigh portion 220 is located on a first side of the transmission apparatus 6. The second thigh portion 240 is located on a second side of the transmission apparatus 6. In some embodiments, the thigh unit 2 further includes a belt pressing apparatus 23 inside. The belt pressing apparatus 23 is in pressing contact with an outer surface of the belt.

The calf unit 3 includes a first calf portion 320 and a second calf portion 340 that are detachably connected to each other. The first calf portion 320 and the second calf portion 340 are in plugged connection, or are connected by using a screw or a nut. The first calf portion 320 and the second calf portion 340 enclose a casing portion of the calf unit 3, and form an inner accommodation cavity of the calf unit 3. In some embodiments, the first calf portion 320 is located on a first side of the transmission apparatus 6. The second calf portion 340 is located on a second side of the transmission apparatus 6. Another end of the calf unit 3 is connected to a sole portion 8. The material of the sole portion 8 may be a wear-resistant material such as rubber or wood.

Illustratively, at least one of the first thigh portion 220, the second thigh portion 240, the first calf portion 320, or the second calf portion 340 is formed by splicing two plate-like structures belonging to a same side. The two plate-like structures are in a riveted, snap-fit plugged, or screwed connection. For example, the first thigh portion 220 in the figure includes the two plate-like structures, to facilitate maintenance and replacement.

Illustratively, the first thigh portion 220, the second thigh portion 240, the first calf portion 320, and the second calf portion 340 are sleeved on the rotary shaft 4 through bearings. A first shaft sleeve 41 is further sleeved between the first thigh portion 220 and the first calf portion 320. The shaft sleeve 41 is configured to separate a bearing inner ring of the bearing corresponding to the first thigh portion 220 from a bearing inner ring of the bearing corresponding to the first calf portion 320, to avoid direct friction between the two. A second shaft sleeve 42 is further sleeved between the second thigh portion 240 and the second calf portion 340. The second shaft sleeve 42 is configured to separate a bearing inner ring of the bearing corresponding to the second thigh portion 240 from a bearing inner ring of the bearing corresponding to the second calf portion 340, to avoid direct friction between the two. In addition, the first shaft sleeve 41 and the shaft sleeve 42 further play an axial positioning role.

Exemplarily, the joint end 301 of the calf unit 3 is clamped between the first thigh portion 220 and the second thigh portion 240. The rotary shaft 4 is clamped between the first calf portion 320 and the second calf portion 340. The traveling wheel 5 is clamped between the first calf portion 320 and the second 340.

A driving wheel 34 is fixed to or formed in a middle portion of the rotary shaft 4. The driving wheel 34 is connected to the calf driving apparatus 153 by the transmission apparatus 6. Using an example in which the transmission apparatus 6 is a belt, the driving wheel 34 is connected to the transmission wheel 533 by the belt. Four sets of pin holes 43 are formed on shaft bodies located on both sides of the driving wheel 34. Each set of pin holes 43 includes two pin holes 43.

The traveling wheel 5 includes a first traveling wheel 51 and a second traveling wheel 52. The first traveling wheel 51 and the second traveling wheel 52 and the driving wheel 34 are fixedly connected. In some other embodiments, the traveling wheel 5 may alternatively be disposed an outer side of a joint of the joint end 301 relative to the robot 10, or disposed an inner side of the joint of the joint end 301 relative to the robot 10. As shown in FIG. 14, in addition to the first traveling wheel 51 and the second traveling wheel 52, the traveling wheel 5 further includes a third traveling wheel 53 located on the outer side of the joint. A wheel diameter of a third traveling wheel 53 is the same as or different from that of the first traveling wheel 51 (and/or the second traveling wheel 52).

The calf unit 3 further includes a locking component 7. The locking component 7 includes a linear motor 71 and a flat pin 72.

Figure 23:
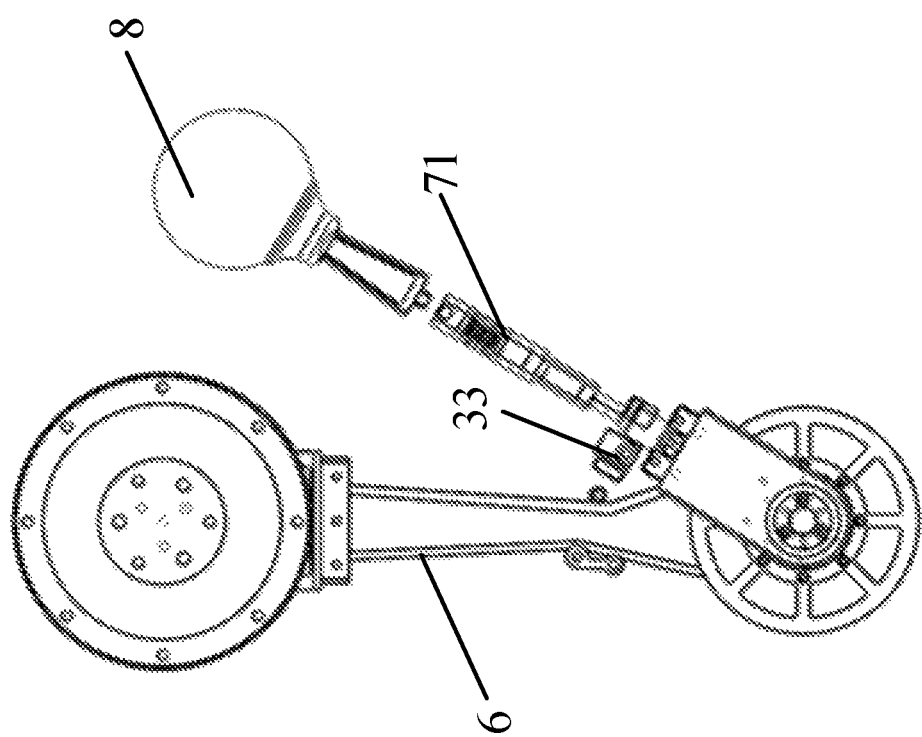
FIG. 23 is a schematic diagram of a connection between a sole portion and a linear motor according to an exemplary embodiment of this application.

The linear motor 71 is a transmission apparatus that converts electrical energy into mechanical energy for a linear movement. In some embodiments, the calf unit 3 includes a motor fixing base 33 therein. The motor fixing base 33 fixes the linear motor 71 to an inner wall of the calf unit 3. In an example, an end of the sole portion 8 is in a plug connection with an end of the linear motor 71, and is clamped and fixed by the first calf portion 320 and the second calf portion 340, as shown in FIG. 23.

The flat pin 72 is fixed to an output end of the linear motor 71. A base of the flat pin 72 may include two parallel fixed beams. The two fixed beams clamp the fixed ends 732 of the two pin shafts 73 on the upper and lower sides, and are fixed with a rivet or a screw. Middle portions of the two fixed beams are fixed to an output end of the linear motor 71.

Figure 24:
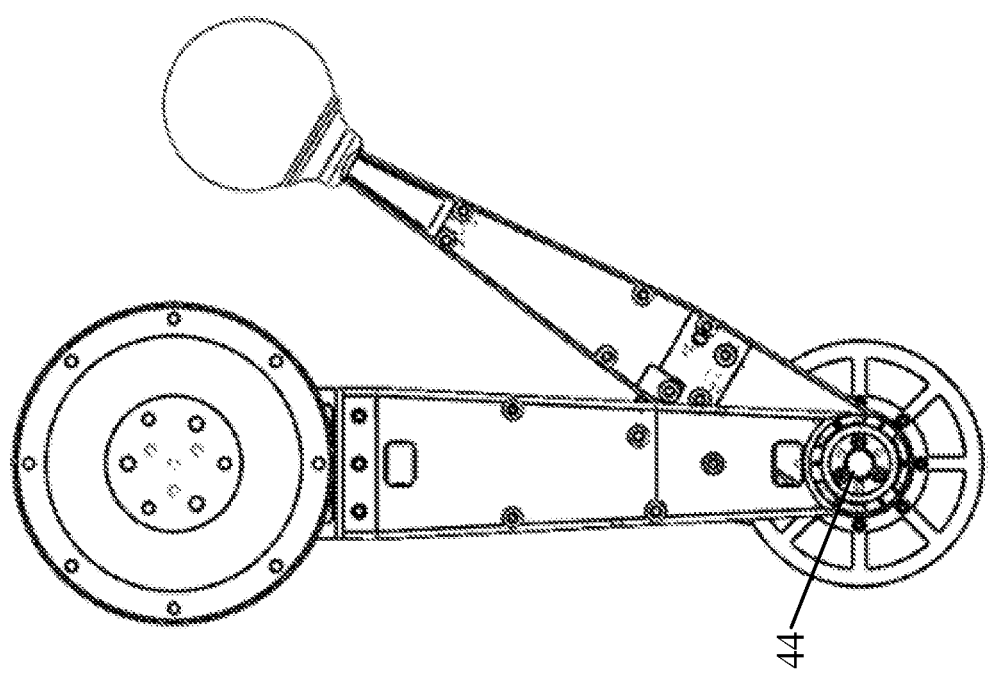
FIG. 24 is a schematic diagram of a magnetic encoder according to an exemplary embodiment of this application.

The two pin shafts 73 on the flat pin 72 are inserted or pulled out from the pin hole 43 under the driving of the linear motor 71. In some embodiments, a magnetic encoder 44 is further provided on the rotary shaft 4. As shown in FIG. 24, the magnetic encoder 44 is configured to record a rotational position of the rotary shaft 4 in real time, so that a controller electrically connected to the magnetic encoder 44 can perform control to accurately insert the two pin shafts 73 into the pin hole 43.

The pin hole shape of the pin hole 43 matches the end shape of the pin shaft 73. That is, the pin hole shape of the pin hole 43 snugly fits the end shape of the pin shaft 73.

When the flat pin 72 is inserted into the pin hole 43, the locking component 7 is inserted into the pin hole on the rotary shaft. The calf unit 3 and the traveling wheel 5 are locked to each other, and the calf unit 3 is fixedly connected to the rotary shaft 4. When the rotary shaft 4 drives the traveling wheel 5 to rotate, the calf unit 3 also rotates with the traveling wheel 5.

When the flat pin 72 is pulled out from the pin hole 43, the locking component 7 is pulled out from the pin hole on the rotary shaft. The calf unit 3 and the traveling wheel 5 are unlocked. The calf unit 3 is rotatably connected to the rotary shaft 4. When the rotary shaft 4 drives the traveling wheel 5 to rotate, the calf unit 3 does not rotate with the traveling wheel 5.

Regardless of whether the locking component 7 is inserted into or pulled out from the pin hole on the rotary shaft, the thigh unit 2 and the rotary shaft 4 are always rotatably connected. The traveling wheel 5 can rotate forward or backward relative to the thigh unit 2.

Figure 25:
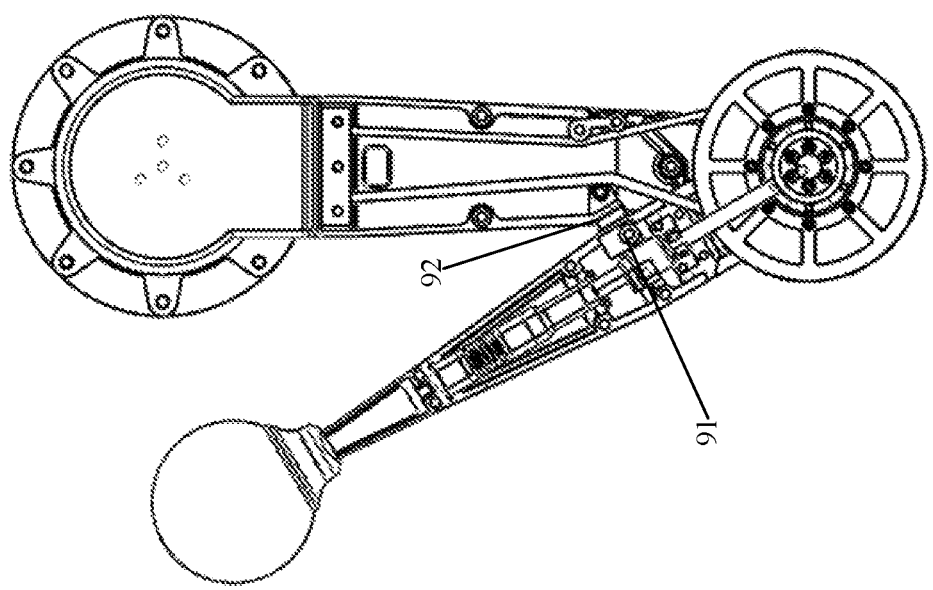
FIG. 25 is a schematic diagram of a magnetic component according to an exemplary embodiment of this application.

In an exemplary design, referring to FIG. 25, the calf unit 3 may include a first magnetic component 91 thereon, and the thigh unit 2 may include a second magnetic component 92 thereon. When the locking component 7 is inserted into the pin hole on the rotary shaft, and the thigh unit 2 and the calf unit 3 are in a contracted and closed state, the first magnetic component 91 and the second magnetic component 92 may be attracted to each other. One of the first magnetic component 91 and the second magnetic component 92 is a magnet, and the other of the first magnetic component 91 and the second magnetic component 92 is a magnet or an iron block.

Based on the above, in the wheel-footed bimodal mechanical leg provided in this embodiment, the locking component is arranged in the calf unit, so that when the locking component is inserted into the pin hole of the rotary shaft, the calf unit and the rotary shaft are locked. The calf unit is fixedly connected to the rotary shaft, so that the driving apparatus drives the calf unit through the rotary shaft to travel in the footed mode. When the locking component is pulled out from the pin hole on the rotary shaft, the calf unit and the rotary shaft are unlocked from each other. The calf unit is rotatably connected to the rotary shaft, so that the driving apparatus drives the traveling wheel through the rotary shaft to travel in the wheeled mode. In this application, only one driving apparatus is needed to implement the wheel-footed bimodal mechanical leg, which simplifies the structure of the wheel-footed bimodal mechanical leg, and is beneficial to the miniaturization and portability of the wheel-footed bimodal mechanical leg.

The locking component provided in this embodiment locks by driving the flat pin to be inserted into the pin hole of the traveling wheel through the linear motor, and unlocks by driving the flat pin to be pulled out from the pin hole of the traveling wheel through the linear motor. The linear motor is hidden inside the calf unit, so that the structure is relatively simple, which can better ensure the miniaturization and portability of the calf unit.

A belt pressing apparatus provided in this embodiment can ensure that the belt in the transmission apparatus is kept in a pressed state, thereby ensuring the driving force applied by the driving apparatus to the traveling wheel.

The first magnetic component and the second magnetic component provided in this embodiment can fix the thigh unit and the calf unit when the wheel-footed bimodal mechanical leg is in the wheeled mode, so that the calf unit does not affect normal traveling of the traveling wheel.

The sequence numbers of the foregoing embodiments of this application are merely for description purpose, and are not intended to indicate the preference among the embodiments.

A person of ordinary skill in the art may understand that all or some of the steps of the foregoing embodiments may be implemented by hardware, or may be implemented a program instructing related hardware. The program may be stored in a computer-readable storage medium. The storage medium may be: a ROM, a magnetic disk, or an optical disc.

The foregoing descriptions are merely exemplary embodiments of this application, but are not intended to limit this application. Any modification, equivalent replacement, or improvement made within the spirit and principle of this application shall fall within the protection scope of this application.

Note that the various embodiments described above can be combined with any other embodiments described herein.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

As used herein, the term "unit" or "module" refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit. The division of the foregoing functional modules is merely used as an example for description when the systems, devices, and apparatus provided in the foregoing embodiments performs footed motion and/or wheeled motion. In practical application, the foregoing functions may be allocated to and completed by different functional modules according to requirements, that is, an inner structure of a device is divided into different functional modules to implement all or a part of the functions described above.

What is claimed is:

1. A wheel-footed bimodal mechanical leg, comprising: a driving apparatus, a thigh unit, and a calf unit,
   a joint end of the thigh unit is hingedly connected to a joint end of the calf unit by a rotary shaft, the rotary shaft being transmission-connected to a traveling wheel, wherein the traveling wheel comprises a pin groove thereon, and the driving apparatus is connected to the rotary shaft by a transmission apparatus;
   the calf unit comprises a locking component, the locking component includes a linear motor and a flat pin, and the flat pin is fixed to an output end of the linear motor;
   the calf unit is fixedly connected to the rotary shaft by the traveling wheel when the locking component is in a locked state, wherein the locking component is in the locked state when the flat pin is inserted into the pin groove; and
   the calf unit is rotatably connected to the rotary shaft when the locking component is in an unlocked state, wherein the locking component is in the unlocked state when the flat pin leaves the pin groove.

2. The wheel-footed bimodal mechanical leg according to claim 1, wherein at least two pin grooves are radially distributed on the traveling wheel.

3. The wheel-footed bimodal mechanical leg according to claim 2, wherein the at least two pin grooves include a first pin groove and a second pin groove, the traveling wheel comprises a first traveling wheel and a second traveling wheel; and
   the first pin groove is formed on a first wheel surface of the first traveling wheel facing the second traveling wheel, and the second pin groove is formed on a second wheel surface of the second traveling wheel facing the first traveling wheel, wherein the number and grooving positions of the pin grooves on the first wheel surface and the second wheel surface are the same.

4. The wheel-footed bimodal mechanical leg according to claim 1, wherein a pin hole is formed on the rotary shaft;
the calf unit is fixedly connected to the rotary shaft in a locked state in which the locking component is inserted into the pin hole; and
the calf unit is rotatably connected to the rotary shaft in an unlocked state in which the locking component is pulled out from the pin hole.

5. The wheel-footed bimodal mechanical leg according to claim 4, wherein the locking component comprises a linear motor and a flat pin, and the flat pin is fixed to an output end of the linear motor;
the calf unit is fixedly connected to the rotary shaft in the locked state in which the flat pin is inserted into the pin hole; and
the calf unit is rotatably connected to the rotary shaft in the unlocked state in which the flat pin is pulled out from the pin hole.

6. The wheel-footed bimodal mechanical leg according to claim 5, wherein
at least two sets of pin holes are distributed on the rotary shaft along a radial direction, each set of pin holes comprising two parallel pin holes; and
the flat pin comprises two parallel pin shafts, the pin shafts corresponding to the pin holes.

7. The wheel-footed bimodal mechanical leg according to claim 6, wherein an end shape of the pin shaft is a first wedge shape, a pin hole shape of the pin hole is a second wedge shape, and the first wedge shape matches the second wedge shape.

8. The wheel-footed bimodal mechanical leg according to claim 1, wherein the calf unit comprises a motor fixing base therein, and the motor fixing base fixes the linear motor to an inner wall of the calf unit.

9. The wheel-footed bimodal mechanical leg according to claim 1, wherein the rotary shaft is further fixedly connected to a driving wheel; and
the driving wheel is connected to the driving apparatus by the transmission apparatus.

10. The wheel-footed bimodal mechanical leg according to claim 9, wherein the transmission apparatus comprises a belt; the thigh unit comprises a belt pressing apparatus; and
the driving wheel is connected to the driving apparatus by the belt, and the belt pressing apparatus is in pressing contact with an outer surface of the belt.

11. The wheel-footed bimodal mechanical leg according to claim 1, wherein:
the calf unit comprises a first magnetic component thereon;
the thigh unit comprises a second magnetic component thereon;
the first magnetic component and the second magnetic component are attracted with each other when the locking component is in the locked state, and the thigh unit and the calf unit are in a contracted and closed state; and
one of the first magnetic component and the second magnetic component is a magnet, and the one of the first magnetic component and the second magnetic component is a magnet or an iron block.

12. The wheel-footed bimodal mechanical leg according to claim 1, wherein the thigh unit comprises a first thigh portion and a second thigh portion that are detachably connected to each other, and the calf unit comprises a first calf portion and a second calf portion that are detachably connected to each other; and
the first thigh portion and the first calf portion are located on a first side of the transmission apparatus, and the second thigh portion and the second calf portion are located on a second side of the transmission apparatus.

13. The wheel-footed bimodal mechanical leg according to claim 12, wherein the joint end of the calf unit is clamped between the first thigh portion and the second thigh portion, and the rotary shaft is clamped between the first calf portion and the second calf portion.

14. The wheel-footed bimodal mechanical leg according to claim 12, wherein the traveling wheel is clamped between the first calf portion and the second calf portion.

15. The wheel-footed bimodal mechanical leg according to claim 12, wherein a first shaft sleeve and a second shaft sleeve are further mounted on the rotary shaft;
the first shaft sleeve is mounted between the first thigh portion and the first calf portion; and
the second shaft sleeve is mounted between the second thigh portion and the second calf portion.

16. The wheel-footed bimodal mechanical leg according to claim 1, wherein one end of the calf unit is connected to a sole portion.

17. The wheel-footed bimodal mechanical leg according to claim 1, wherein an auxiliary wheel is disposed on a near-ground side of the calf unit.

18. A robot, comprising:
a wheel-footed bimodal mechanical leg having a driving apparatus, a thigh unit, and a calf unit;
a joint end of the thigh unit is hingedly connected to a joint end of the calf unit by a rotary shaft, the rotary shaft being transmission-connected to a traveling wheel, wherein the traveling wheel comprises a pin groove thereon, and the driving apparatus is connected to the rotary shaft by a transmission apparatus;
the calf unit comprises a locking component, the locking component includes a linear motor and a flat pin, and the flat pin is fixed to an output end of the linear motor;
the calf unit is fixedly connected to the rotary shaft by the traveling wheel when the locking component is in a locked state, wherein the locking component is in the locked state when the flat pin is inserted into the pin groove; and
the calf unit is rotatably connected to the rotary shaft when the locking component is in an unlocked state, wherein the locking component is in the unlocked state when the flat pin leaves the pin groove.

* * * * *